Figure 1:
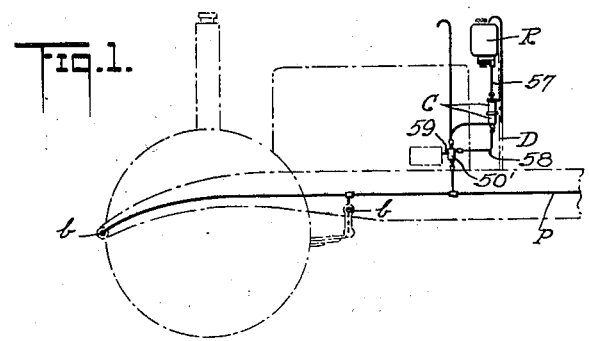

July 31, 1934.  J. BIJUR  1,968,023

CENTRAL LIQUID DISTRIBUTION

Filed Aug. 2, 1928  13 Sheets-Sheet 1

INVENTOR
Joseph Bijur
BY
his ATTORNEYS.

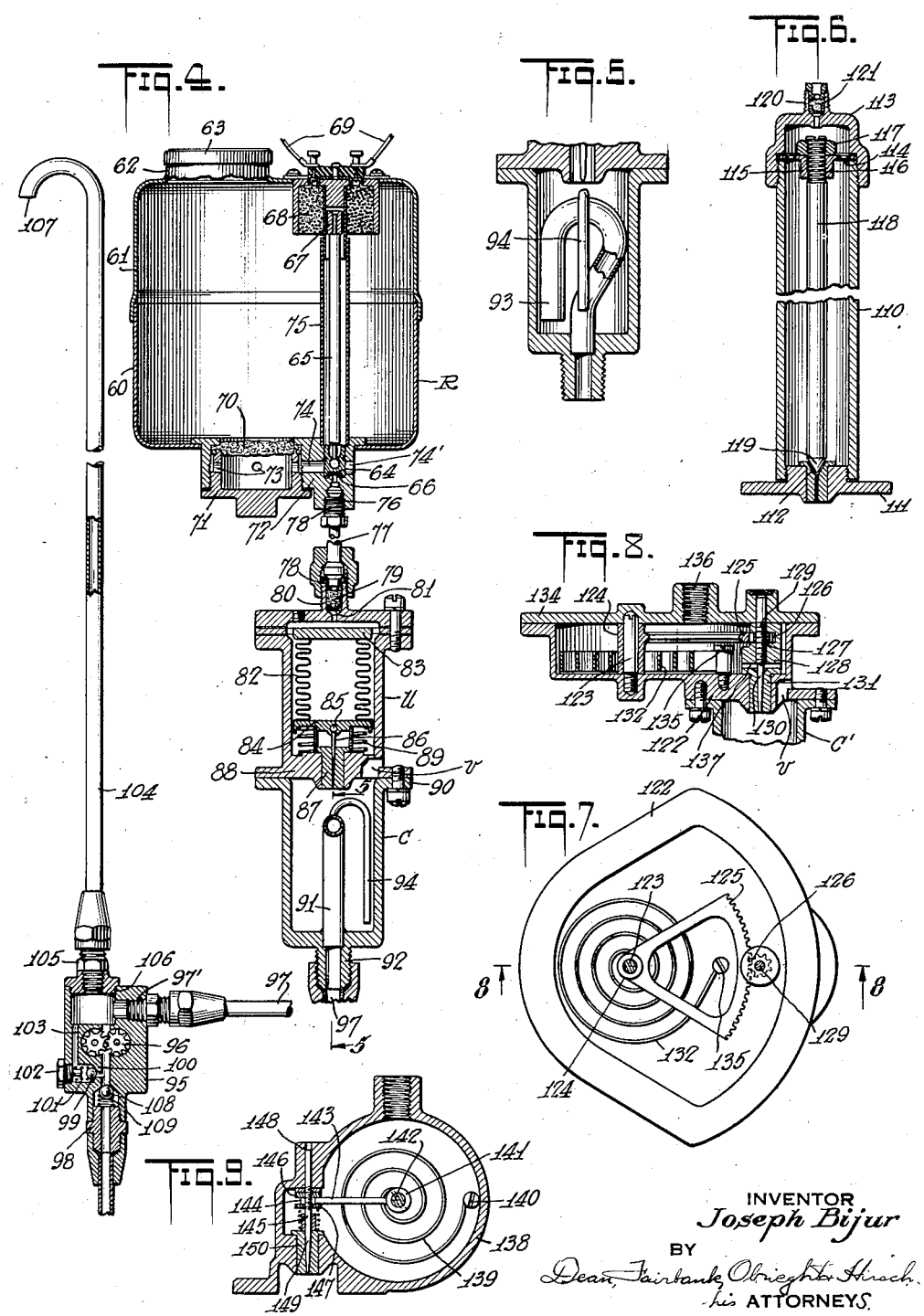

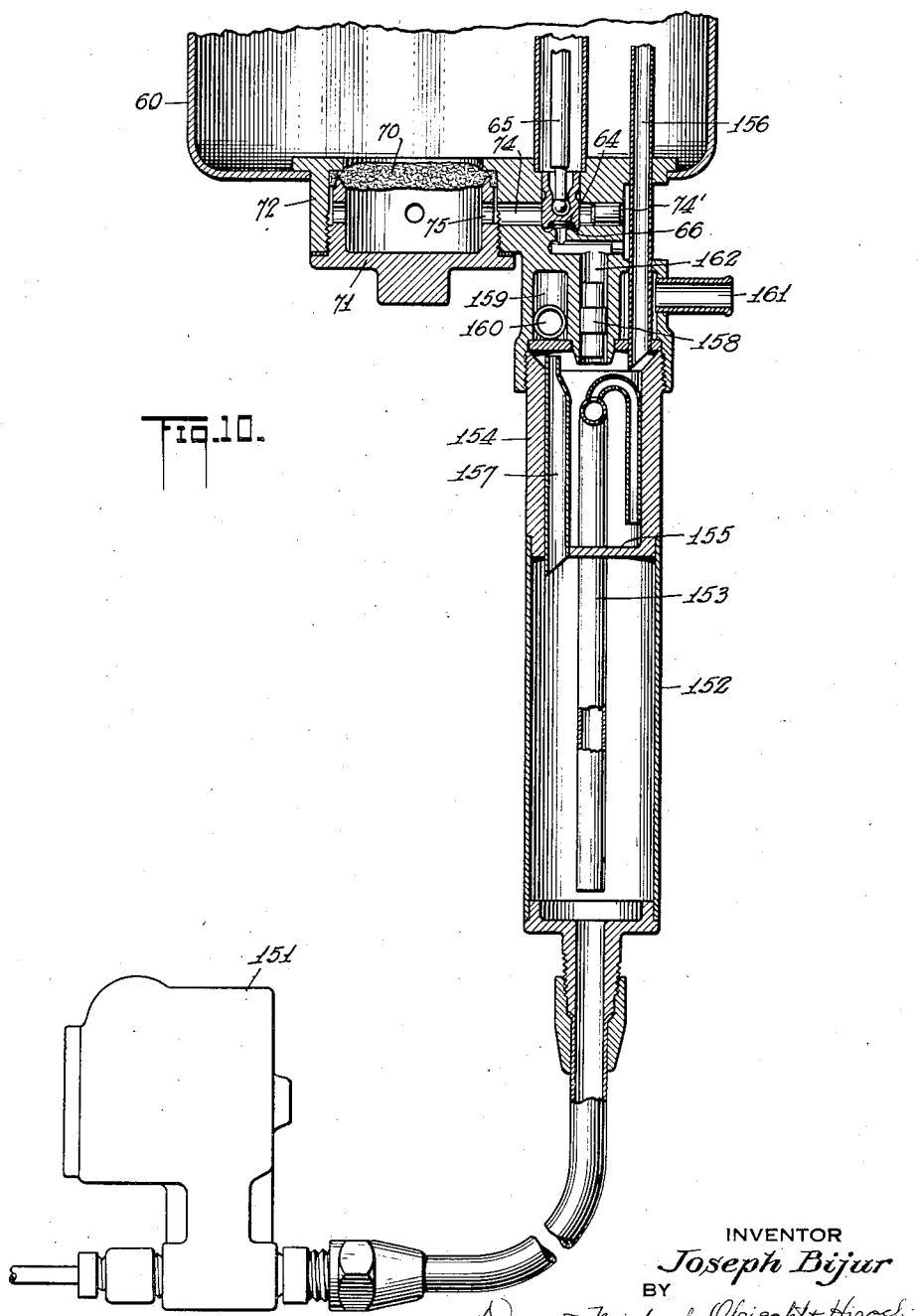

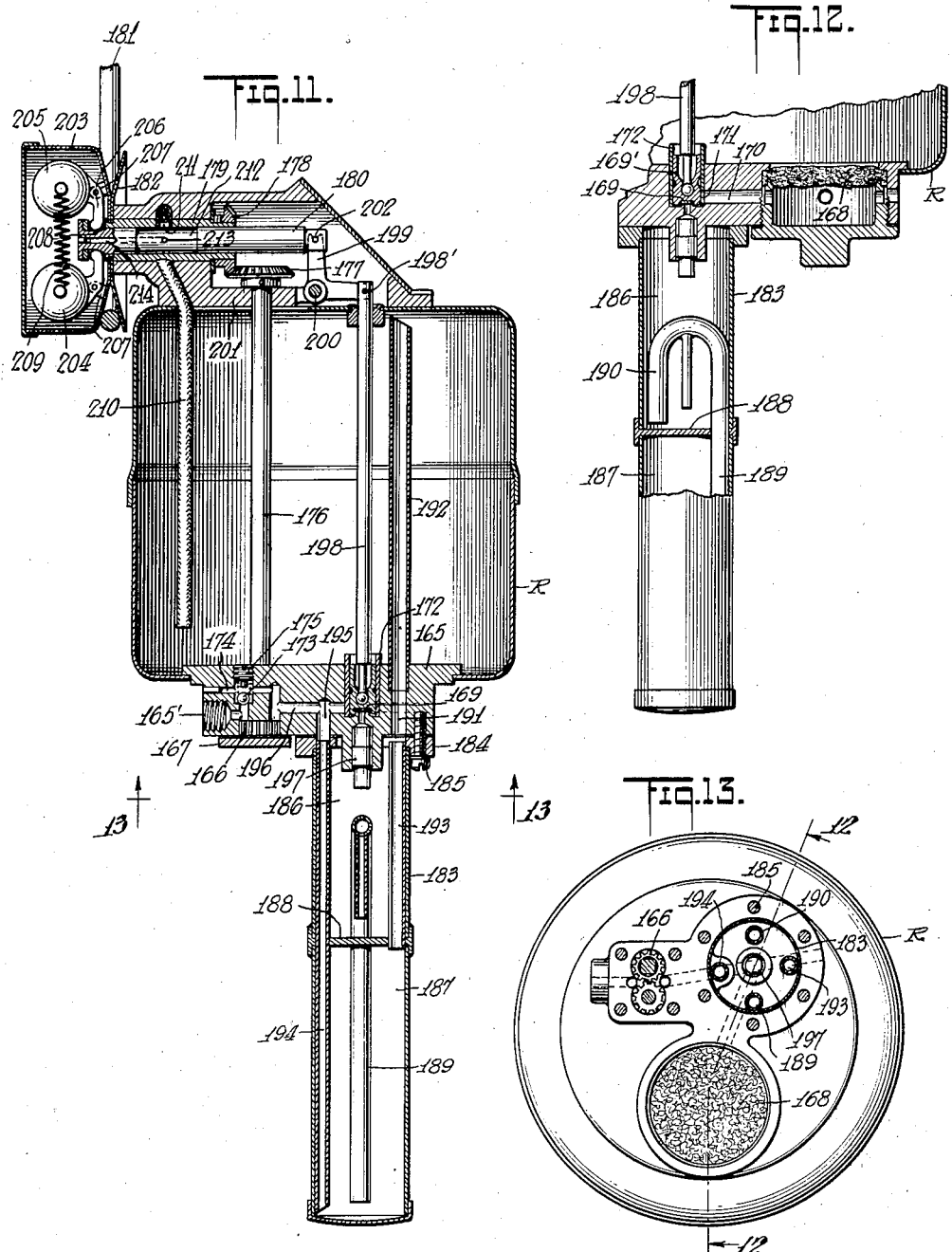

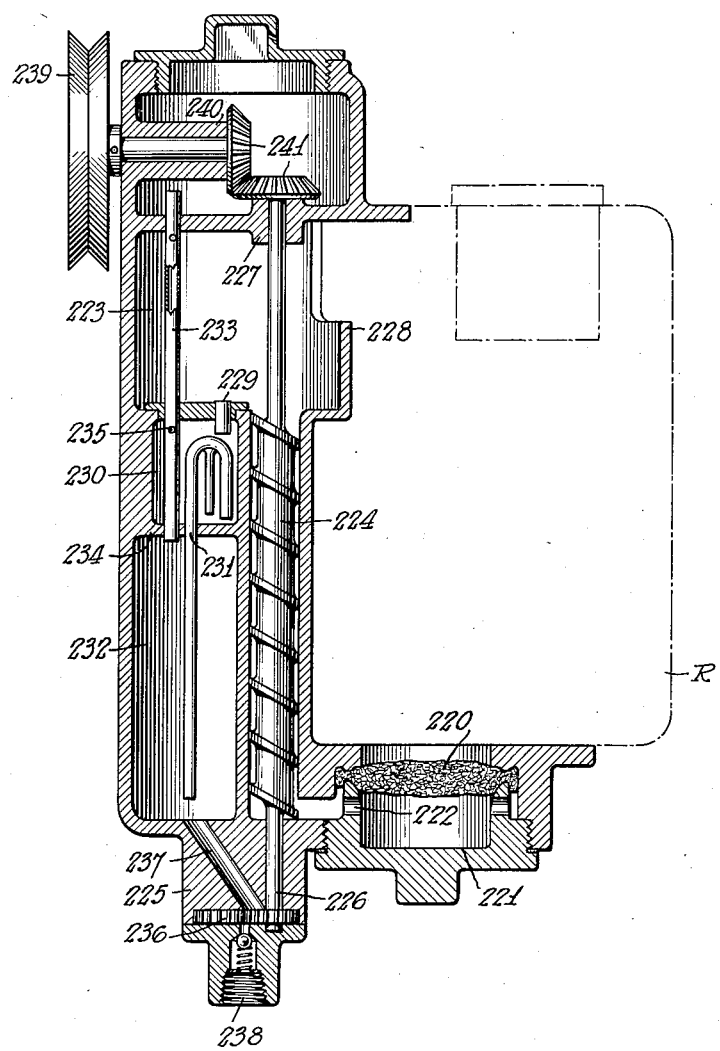

July 31, 1934.  J. BIJUR  1,968,023
CENTRAL LIQUID DISTRIBUTION
Filed Aug. 2, 1928  13 Sheets-Sheet 6
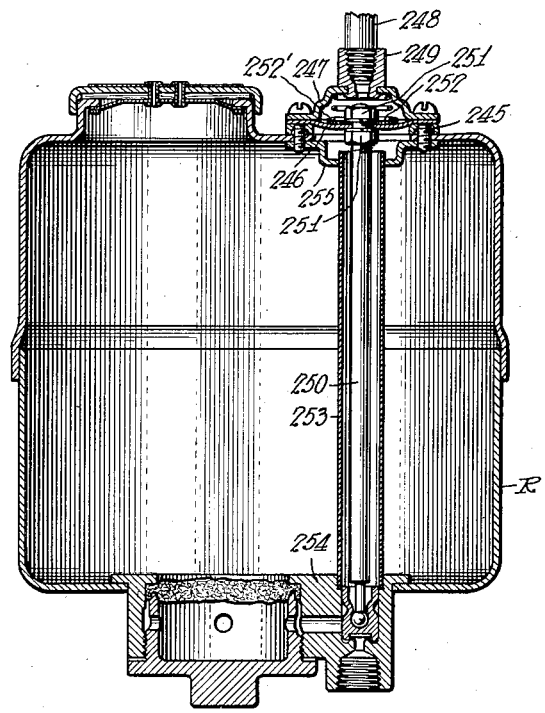
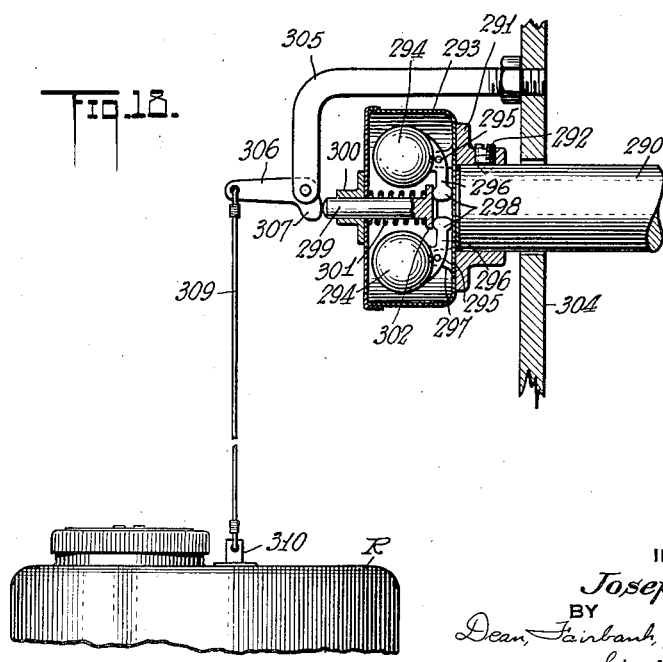
INVENTOR
Joseph Bijur
BY
Dean, Fairbank, Obrieght & Hirsch
his ATTORNEYS

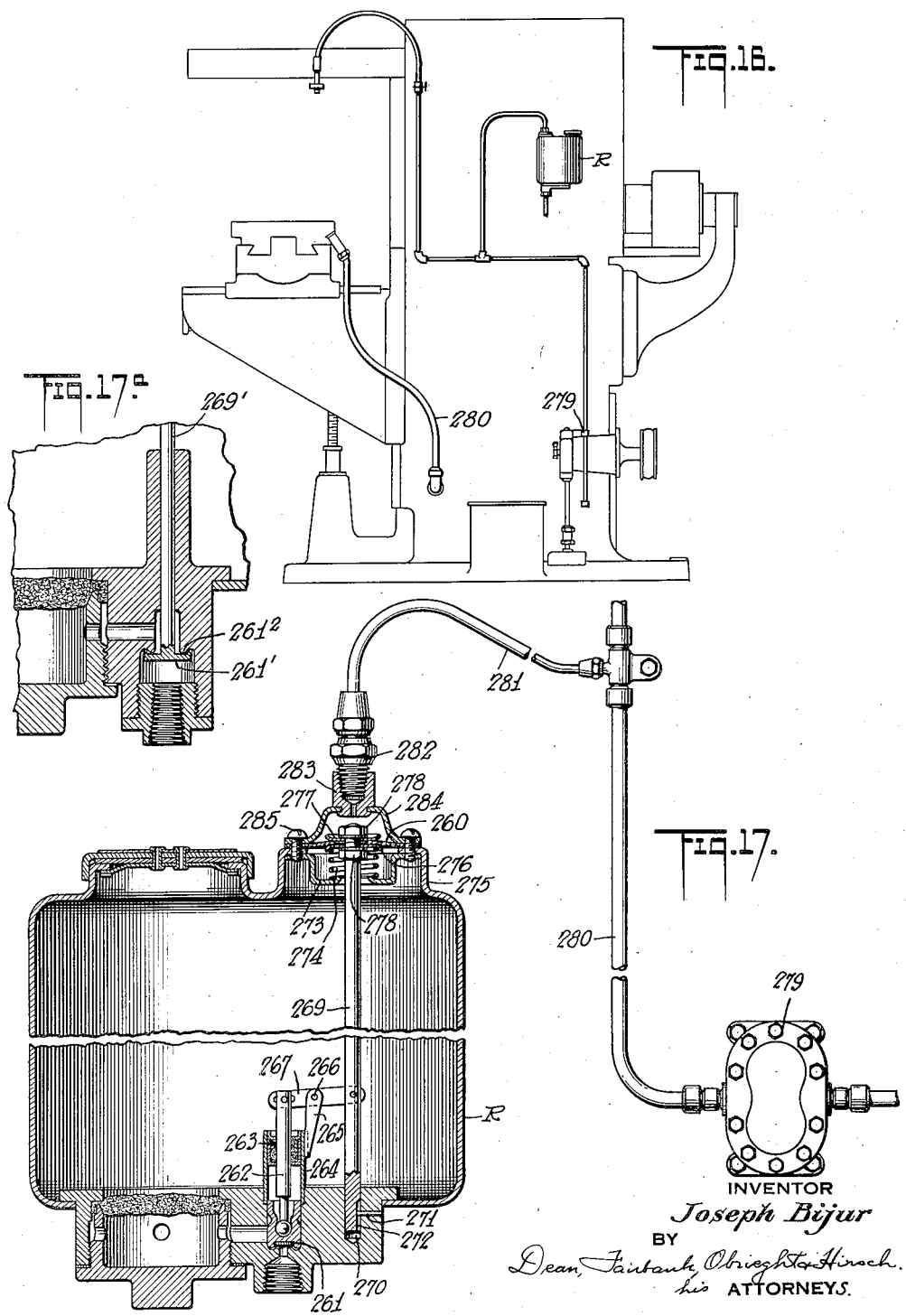

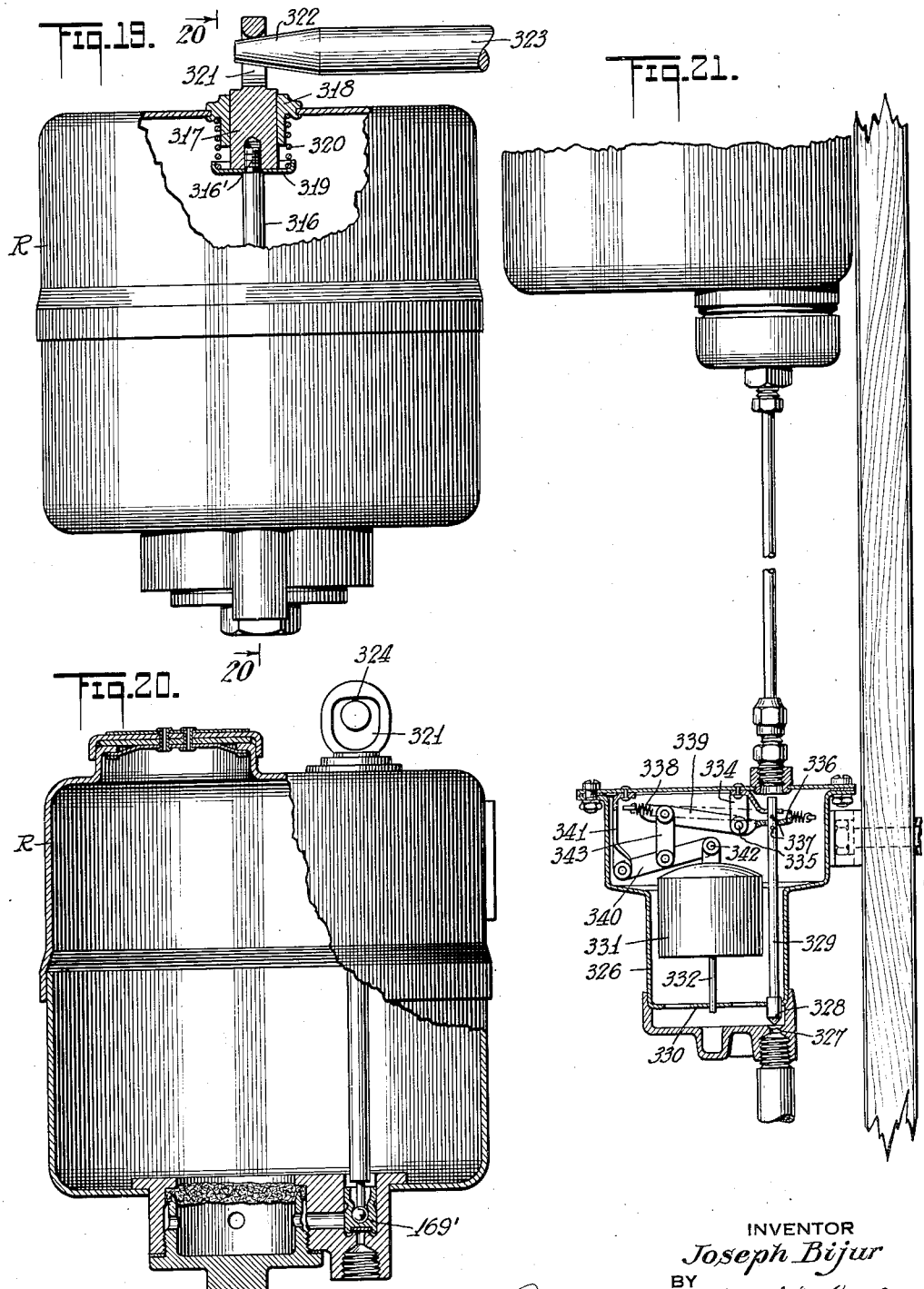

July 31, 1934.    J. BIJUR    1,968,023
CENTRAL LIQUID DISTRIBUTION
Filed Aug. 2, 1928    13 Sheets-Sheet 9
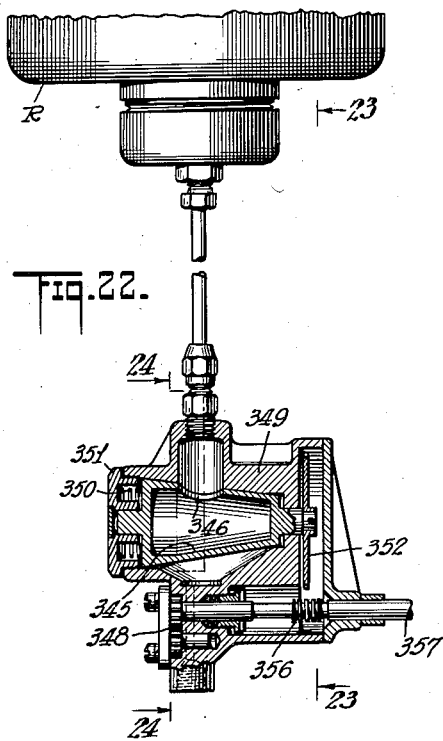
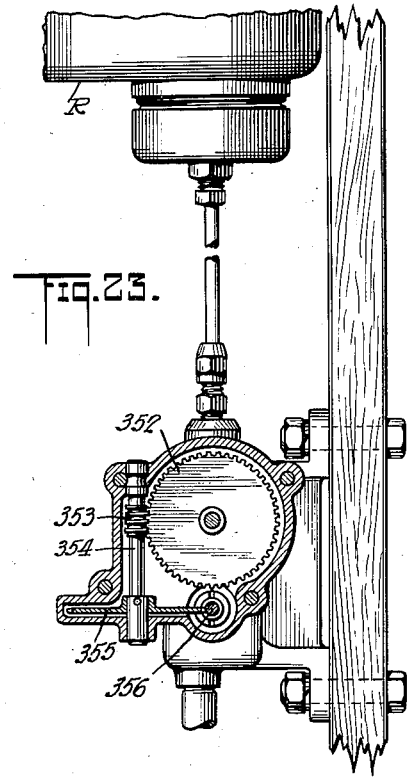
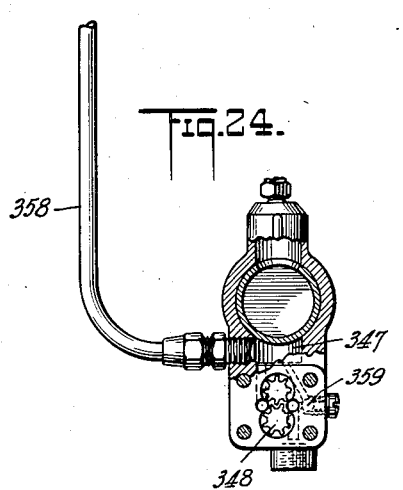
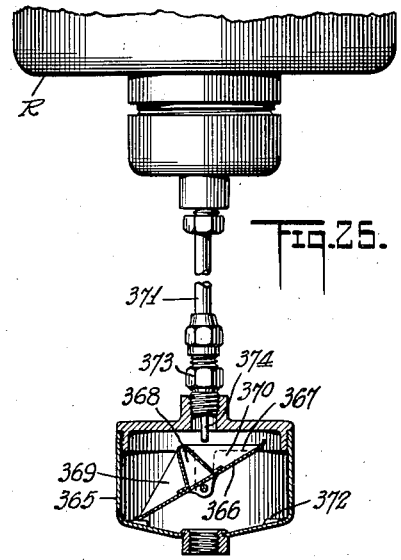
INVENTOR
Joseph Bijur
BY
Dean, Fairbank, Obrieght & Hirsch
his ATTORNEYS July 31, 1934.   J. BIJUR   1,968,023
CENTRAL LIQUID DISTRIBUTION
Filed Aug. 2, 1928   13 Sheets-Sheet 10
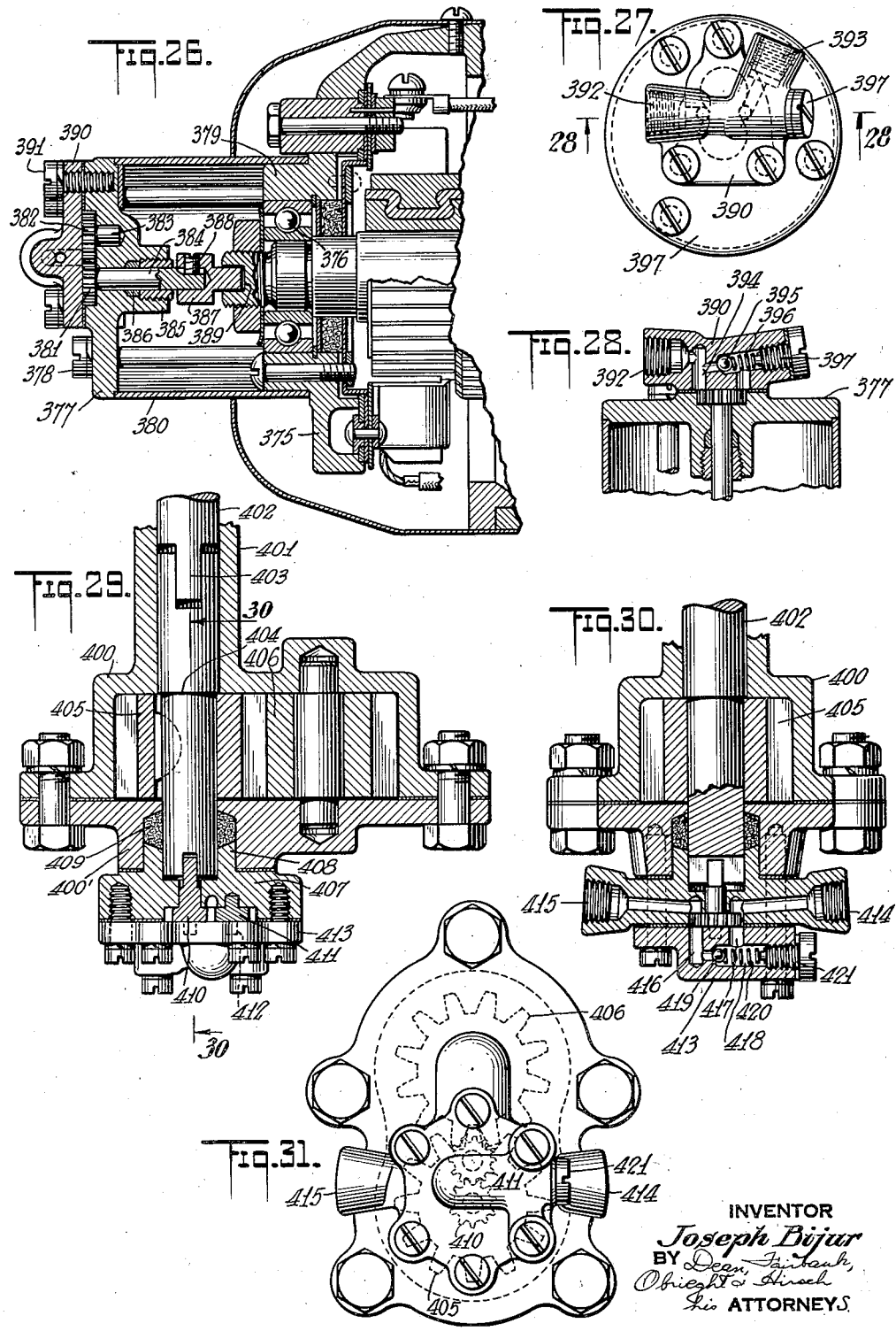

July 31, 1934.    J. BIJUR    1,968,023
CENTRAL LIQUID DISTRIBUTION
Filed Aug. 2, 1928    13 Sheets-Sheet 11
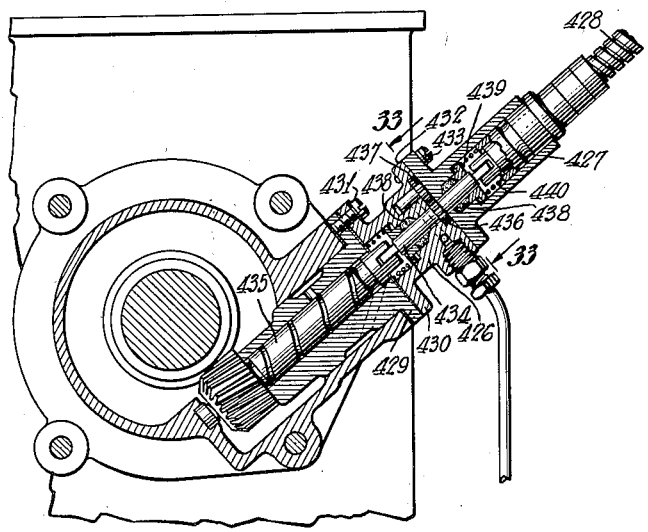
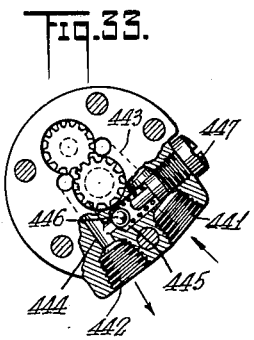
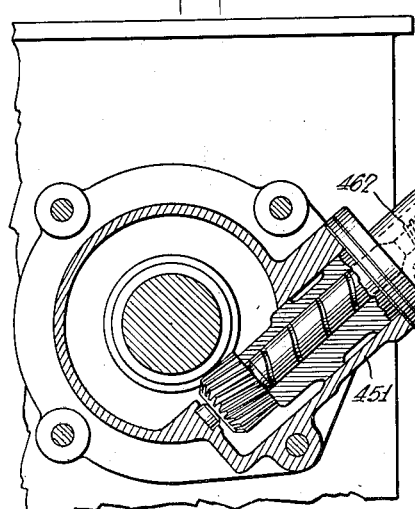
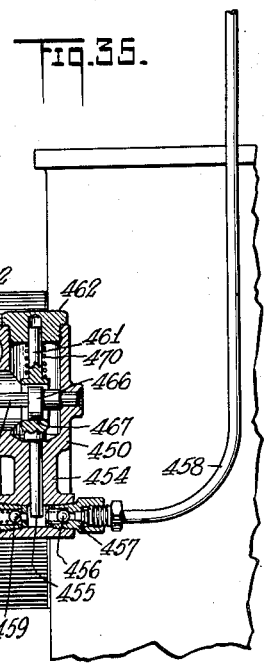
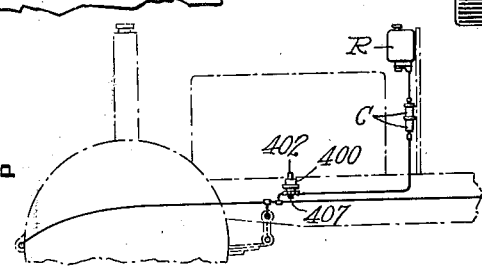
INVENTOR
Joseph Bijur
BY Dean Fairbank,
Obright & Hirsch
his ATTORNEYS July 31, 1934.  J. BIJUR  1,968,023
CENTRAL LIQUID DISTRIBUTION
Filed Aug. 2, 1928     13 Sheets-Sheet 12

INVENTOR
Joseph Bijur
BY
Dean, Fairbank, Obrieght & Hirsch
his ATTORNEYS.

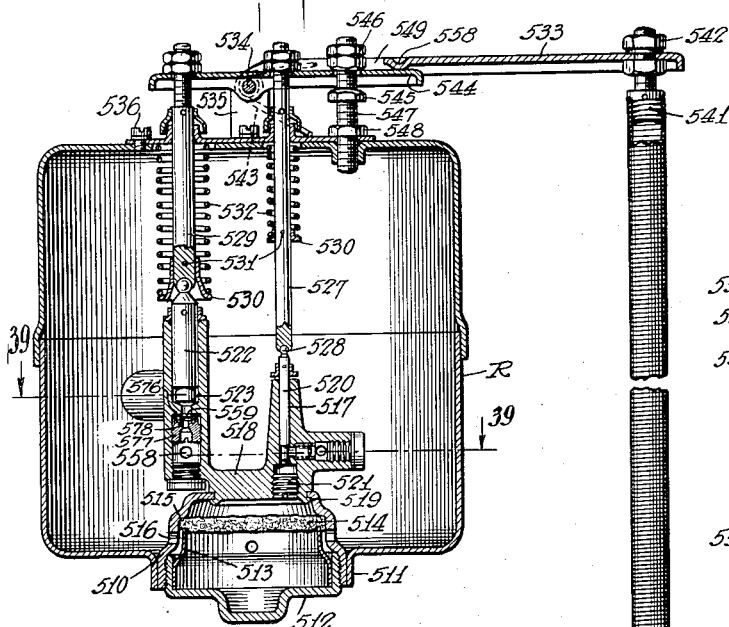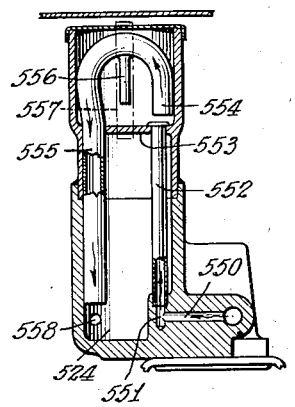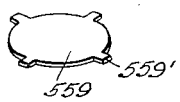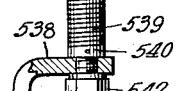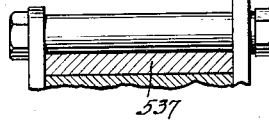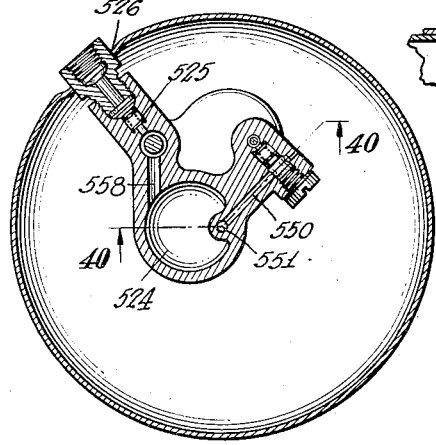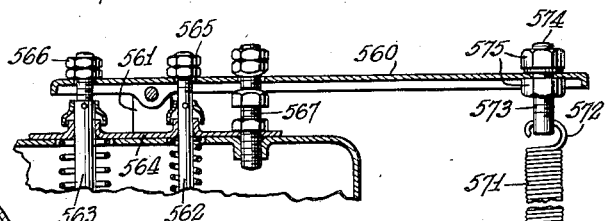

Patented July 31, 1934

1,968,023

UNITED STATES PATENT OFFICE 1,968,023

CENTRAL LIQUID DISTRIBUTION

Joseph Bijur, New York, N. Y., assignor to Auto Research Corporation, a corporation of Delaware Application August 2, 1928, Serial No. 296,975

78 Claims. (Cl. 184—7)

My present invention is primarily concerned with methods and apparatus for propelling liquid under pressure and has a preferred application to lubrication, more especially to central lubrication.

It is among the objects of the invention to provide a method and apparatus strictly automatic in operation for propelling the lubricant or other liquid in accordance with requirements.

More specifically it is an object to provide a method and apparatus applicable to, and in combination with a distributing system, such as disclosed and claimed in my prior Patent No. 1,632,771 of June 14, 1927 and which dispenses with the manual operation intended for a pump such as that disclosed in the drawings of said patent, but accomplishes the characteristic desired operation of such distributing system, without the need for any manual operation whatsoever.

The present invention thus provides means and methods for automatically supplying lubricant under pressure to a distributing system, and in which there is neither a reduction in lubricant feed, nor a great increase in line pressure, with enormous increase in viscosity of the lubricant, in which each bearing receives its correct proportionate share of lubricant, and in which a substantial rush of lubricant occurs at those places which are intended to deliver by overflow to associated bearings.

Another object is to provide a pressure supply installation of the above type presenting a minimum of simple and inexpensive elements of rugged construction, not apt to become deranged in practical use.

Another object is to provide a pressure supply installation and method of the above type, which lends itself readily for application to a great diversity of different types of mechanisms, machinery and plants and the operation of which is not impaired or disturbed by the presence of cleansing filters.

According to the invention, lubricant or other liquid is automatically and periodically segregated from a source of supply, and the segregated volume is discharged into the distributing system. Preferably the volume is segregated by slow delivery from the source to a collector, the feed being effected either by drip or by slow pressure propulsion, as by a servo-pump. Substantial collected volumes are automatically and intermittently drained or discharged from the collector, preferably to a force pump, for propulsion by the latter into the distributing system.

The force pump is preferably continuously driven by the running mechanism of the vehicle or other mechanism and propels liquid only at such times as a pre-collected or segregated charge has been delivered thereto.

The collecting means may be embodied in any of a plurality of different forms, but I prefer the use of a vessel with a siphon therein, communicating with the pressure pump, the lubricant after it has risen to a predetermined level in the vessel being rapidly siphoned as a volume to the pump for propulsion into the distributing system.

Among other arrangements for collecting and periodically releasing volumes of lubricant are a float controlled chamber automatically opened to discharge after the float has been lifted by the collected lubricant to a predetermined level, a rotary collecting valve filled through a port and slowly revolved by the operating mechanism to discharge its collected volume, when the port has reached the bottom; or a pivoted twin bucket construction draining by tilting when a predetermined weight has collected in one of the buckets, thereby placing the companion bucket in the path of drip from the supply.

The pump which may be of any suitable type, including reciprocating or rotary, may be disposed in any of a wide variety of relations. For motor vehicle use, the pump may be disposed for instance, on the generator drive shaft or on the engine oil pump or on the speedometer or other accessory drive. It may also be embodied in a unitary construction with a mechanical fuel pump, for instance.

Preferably, the reservoir is automatically shut off to cease dripping or supplying lubricant to the collector, as soon as the vehicle or other mechanism has ceased operation. Where the continuous feed is produced by a continuously operated servo pump, a valve is preferably embodied with said pump to close and prevent leak when the mechanism comes to rest. Where the feed from the reservoir is by drip, a valve correlated with the running vehicle or mechanism is preferably provided to remain open as long as the mechanism operates and to automatically close when the mechanism comes to rest.

Among the various alternative arrangements for control of such valve from machinery generally, are the interlock with the belt shift, the control from the pressure generated in the cutting or circulating oil circuit, or control by centrifugal means. Of more particular utility for automobile chassis lubricating installations are control from a solenoid in the ignition circuit, control from the intake or exhaust manifold, and control due to the vibration of the vehicle in operation, the latter mode of control being more particularly applicable in connection with, though not limited to a servo pump.

Where the lubricant is fed from the reservoir to the collector by drip, it is preferable to employ a temperature adjustment for the drip outlet in order to compensate for the rapid rise in viscosity of lubricant due to drop in temperature.

While the various constituent elements including the reservoir, the collector and the force pump may be disposed at various convenient places on the lubricated mechanism, it is frequently desirable to embody two or all three of said constituent elements in a unitary construction.

Figure 2:
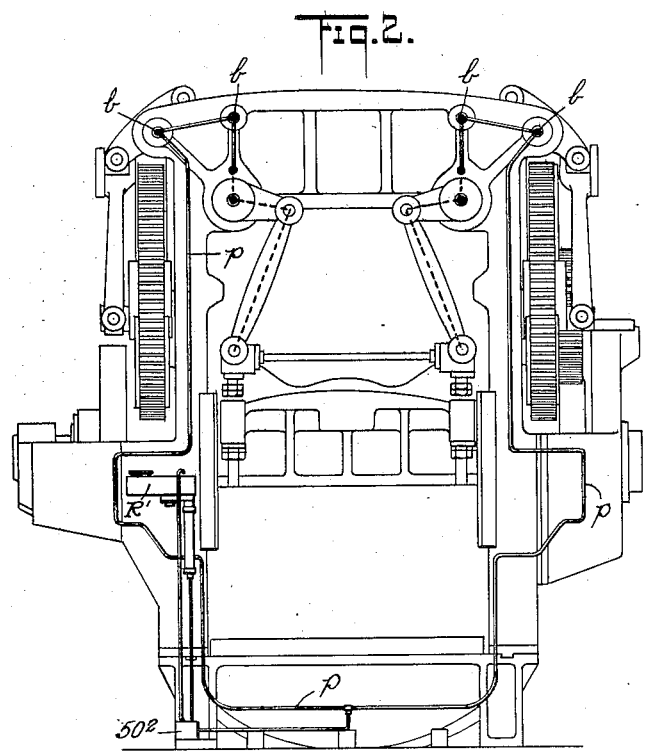
Figure 3:
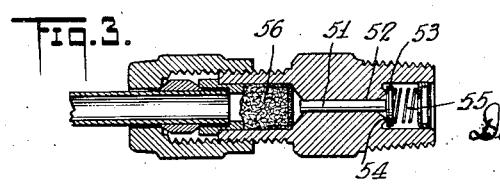

In the accompanying drawings in which are shown one or more of various possible embodiments of the several features of the invention, Fig. 1 shows a side view of an automobile, indicating diagrammatically a desirable relation of the constituent parts of the lubricating system, Fig. 2 is a diagrammatic view generally similar to Fig. 1, showing the embodiment of a system of that general type in a machine installation, Fig. 3 is a section of a terminal of the distributing system indicating a desirable construction of drip plug, Fig. 4 is a view in longitudinal cross-section indicating in greater detail the construction of the supply installation of Fig. 1, Fig. 5 is a fragmentary sectional view taken on the line 5—5 of Fig. 4, Fig. 6 is a view in longitudinal cross-section of one form of thermostatic drip plug, Fig. 7 is a plan view of another form of thermostatic drip plug, Fig. 8 is a sectional view taken on the line 8—8 of Fig. 7, Fig. 9 is a view in transverse cross-section of another alternative form of drip plug, Fig. 10 is a view alternative to Fig. 4 showing a water jacket drip plug and a different arrangement of vent, the upper parts being cut away, Fig. 11 is a view in longitudinal cross-section of another type of supply installation useful more especially with a machine such as illustratively shown in Fig. 2, Fig. 12 is a fragmentary sectional view taken on line 12—12 of Fig. 13, Fig. 13 is a transverse cross-sectional view taken on line 13—13 of Fig. 11, Fig. 14 is a view similar to Fig. 11 of another embodiment, Fig. 15 is a view in longitudinal cross-section of a lubricant reservoir showing a form of outlet control alternative to that shown in Fig. 4, Fig. 16 is a view similar to Fig. 2 showing a different control arrangement for lubrication, Fig. 17 is a view in longitudinal cross-section indicating the manner of control of the embodiment of Fig. 16, Fig. 17a is a fragmentary detail view of a modification, Fig. 18 is a fragmentary sectional view illustrating another mode of controlling the outlet from the reservoir, Fig. 19 is a view similar to Fig. 15 indicating a further mode of control, Fig. 20 is a view partly in section taken on line 20—20 of Fig. 19, Fig. 21 is a view in longitudinal cross-section of a float controlled lubricant collector, Fig. 22 is a view in transverse cross-section of an alternativ arrangement of collector, Fig. 23 is a sectional view taken on line 23—23 of Fig. 22, Fig. 24 is a sectional view taken on line 24—24 of Fig. 22, Fig. 25 is a view in longitudinal cross-section showing a further embodiment of lubracant collector more especially useful for machine lubrication, Fig. 26 is a fragmentary view in longitudinal cross-section showing one arrangement of force pump unit, Fig. 27 is an end view of the embodiment of Fig. 26, Fig. 28 is a fragmentary sectional view on the line 28—28 of Fig. 27, Fig. 29 is a view in longitudinal cross-section of another arrangement of force pump, Fig. 30 is a view in longitudinal cross-section taken on line 30—30 of Fig. 29, Fig. 31 is an end view of the embodiment of Fig. 29, Fig. 31a is a fragmentary diagrammatic view on a small scale showing the installation of the embodiment of Figs. 29 to 31, Fig. 32 is a fragmentary sectional view in longitudinal cross-section of another arrangement of force pump, Fig. 33 is a fragmentary cross-section taken on line 33—33 of Fig. 32, Fig. 34 is a view similar to Fig. 32 of another embodiment.

Figure 36:
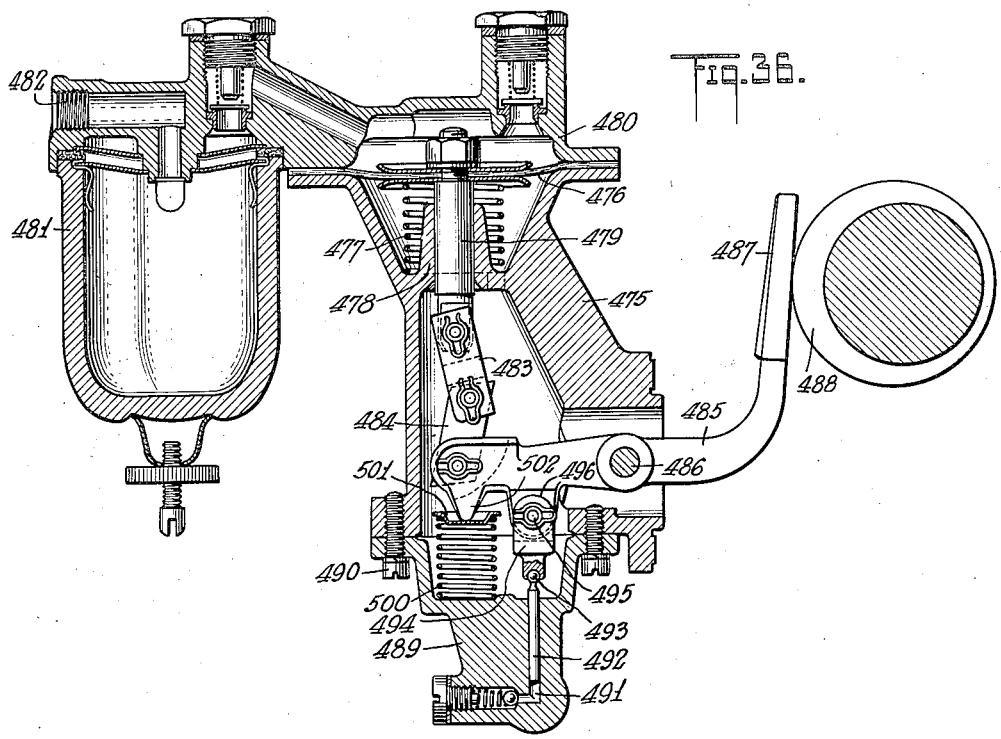
Figure 37:
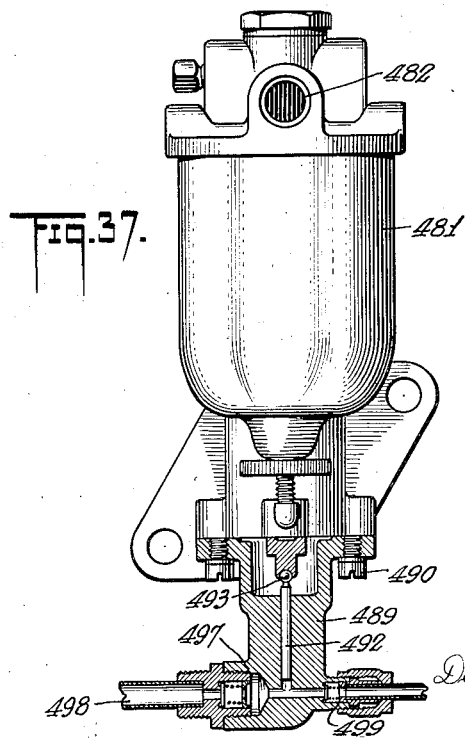

Fig. 35 is a view in longitudinal section taken on line 35—35 of Fig. 34,

Fig. 36 is a view in longitudinal cross-section showing a compound fuel pump and chassis lubricating pump, Fig. 37 is an end view of Fig. 36 partly in section, Fig. 38 is a view in longitudinal cross-section of another embodiment of lubricant supply installation, Fig. 38a is a perspective view of the check valve, Fig. 39 is a cross-sectional view taken on line 39—39 of Fig. 38, Fig. 40 is a fragmentary longitudinal section taken on line 40—40 of Fig. 39, and, Fig. 41 is a fragmentary sectional view of an alternative embodiment of part of the construction of Fig. 38.

Referring now to the drawings, I have shown in Fig. 1, a diagrammatic view of a motor vehicle and in Fig. 2 a diagrammatic view of a stationary machine installation, illustratively a press. In both mechanisms, I have indicated diagrammatically a force pump $50'$ and $50^2$ respectively connected to feed lubricant to a distributing system, comprising piping $p$ extending along the respective frame structures and leading to various bearings thereof, the location of which is diagramatically indicated by reference characters $b$. While the present invention is applicable to other types of distributing systems, it has special utility for feeding a distributing system substantially as shown and claimed in my issued Patent No. 1,632,771. It may be briefly noted that in the patented system, the installation such as shown at $p$ in Figs. 1 and 2 herein, has drip plugs disposed at each pressure outlet. One of these drip plugs is shown in Fig. 3, and embodies a restriction illustratively comprising a pin 51 nearly filling a bore 52, a relief valve 53 normally urged against its seat 54 by a coil spring 55 to prevent leak from the oil filled pipe system during the intervals between the operations, and a strainer plug 56 preferably of wool felt controlling the inlet to the drip plug. Further detailed description of the drip plug construction is not required, as the same by itself is no part of the present invention.

Reverting now to Fig. 1, I have indicated diagrammatically a reservoir R at high level on the dashboard D, a collecting unit C mounted therebelow and connected thereto by a pipe 57 and draining through a pipe 58 to the force pump 50', which in this system is illustratively shown mounted on the end of the generator shaft 59.

In Fig. 4 is shown on a larger scale the construction of the lubricant supply arrangement. The reservoir R is illustratively composed of a pair of cups 60 and 61 telescoped at their open ends, providing a bottom and a top, the latter with a filling neck 62 closed by a cap 63. The outlet from the reservoir is preferably sealed by a valve 64 at the end of a plunger 65 and normally urged against its seat 66 by virtue of the weight of the plunger. The plunger 65 has a soft iron sleeve 67 at its top extending within the bore of a solenoid 68 connected by conductors 69 preferably in series with the ignition switch (not shown) so that as long as the engine is running, the solenoid will be energized and the plunger 65 maintained in raised position, holding the valve 64 off its seat to permit drainage of lubricant from the reservoir to the structure therebelow.

The lubricant is filtered before it leaves the reservoir by seepage through a filter disk 70, the rim of which is maintained under compression by a hollow cup 71 threaded into the base casting 72 which is soldered into the bottom of the reservoir. The lubricant that has passed the filter 70 flows out from ports 73 in the cup 71 into the lateral bore 74 in the base casting, said bore plugged at its outer end 74' and communicating with the valve outlet 66. Preferably a sleeve 75 encircling the plunger 65 is mounted in lubricant-tight relation with the base, to prevent unfiltered oil from reaching the valve 64. These parts appear on larger scale in Fig. 10.

Preferably the outlet 76 of the reservoir R is connected by a drain pipe 77 to the collecting unit C to be fully described below. The pipe 77 is connected by appropriate couplings 78 to the reservoir at one end and to the inlet of the collecting assembly C at the other. A felt strainer plug 79 is also preferably embodied in the inlet socket 80 to the collecting unit C and is backed by a wire mesh piece 81 to intercept any scale or chip carried with the lubricant.

The rate of drip from the reservoir during operation of the engine is preferably controlled by a thermostatic drip plug unit U at the upper part of the collector unit C therebelow. This unit, in one embodiment, comprises a bellows metal diaphragm 82 preferably filled with a heat expansible fluid, sealed by a head 83 at its upper end and by a head 84 at its lower, the latter head having a ball socket mount 85 for a taper pin 86 extending downward therefrom into a taper bore 87 in the end wall structure 88. A coil spring 89 confined between end wall 88 and head 84 tends to collapse the bellows 82. Thus, it will be apparent that as the expansive medium within the bellows contracts under temperature drop, the spring 89 correspondingly urges the bellows head upward and correspondingly withdraws the taper pin 86 from bore 87 to enlarge the effective area of the bore, to prevent great variations in the rate of drip, with change of viscosity, due to temperature fluctuations.

The collecting vessel C, which is preferably bolted at its flange 90 to the thermostatic flow control unit U, has a siphon therein comprising a tube 91 with a hair pin bend and affixed at its lower end to the outlet nipple 92 of the collector and having its open end 93 at somewhat higher level within the unit. The siphon preferably includes a siphon breaker construction comprising a pipe 94 of smaller bore, extending into the uppermost part of the siphon proper and drooping downward therefrom. The siphon chamber C is vented at v through the end wall 88.

The force pump shown of the gear type, is supplied from siphon 91 through a connecting pipe 97. The pump comprises a casing 95 with a pair of intermeshing gears 96 that propel the lubricant which has been admitted through the inlet 97' to be discharged under pressure through the outlet 98, to which the distributing system is connected. Preferably a safety or relief valve 99 is provided, to prevent the building up of excessive pressure in the distributing system. This valve is pressed against its seat 100 by a coil spring 101 retained under compression by a closure plug 102 threaded into the side of the casing, and normally shuts off the by-pass 103 connecting the inlet and the outlet sides of the gear pump.

Preferably a venting pipe 104 is retained by a union 105 threaded into the upper wall 106 of the gear pump casing and extends upward to a level higher than the highest level of lubricant in the reservoir R. The upper end of the pipe 104 is preferably turned downward as at 107 to prevent the dropping of foreign particles thereinto.

Normally when the vehicle is stationary, the valve 64 is closed and the draining of lubricant is prevented. Upon starting of the vehicle, the solenoid 68 is energized, lifting the rod 65 and unseating the valve 64 to permit exit of lubricant previously cleansed by filter 70 into the pipe 77. Any solid particles or chips carried with the lubricant are intercepted by felt 79 and the rate of drip is maintained nearly constant by the thermostatic drip lug unit U, the lubricant continuously dripping throughout the running of the vehicle past the open valve 64 and restriction 86 into the collector vessel C therebelow. Throughout this operation, the gears of the gear pump are, of course, being revolved from the generator shaft 59, but receive no oil to be propelled. As the lubricant dripping into the collector chamber, reaches a level above that of the siphon 91, it will be understood that the tension of the lubricant in the pipe 97 will cause the siphon to operate and promptly withdraw the lubricant as one volume from the collector vessel into the gear pump casing 95, the pump in its continuous operation, now propelling such volume of lubricant under pressure into the distributing system. If the pump casing were closed, where the vent pip is inserted, it is apparent that the gear pump in its continuous rotation, would exert a suction upon the oil and air ahead of it and would drain the lubricant from the pipe 97 and possibly slowly draw the lubricant from the collector chamber as quickly as such lubricant is admitted. By venting the pump, as shown, the application of suction due to pump operation, on the pipe 97 is prevented and the pump will act only to propel lubricant after the siphon has delivered a charge to the pump. In consequence, since no suction is induced in the siphon pipe by the force pump, the siphon will not operate until the oil in the collector exceeds the height of the siphon and the siphoning action is then induced by gravity. This siphoning action ceases as soon as the oil level in the accumulator falls below the lower end of the siphon breaker pipe 94. At this time air rushing through the breaker pipe into the main pipe of the siphon will quickly interrupt the oil stream and permit some of the oil then present in the upflow leg of the siphon to drain back into the accumulator chamber. The lubricant in seeking its own level, might tend to leak from out of the upper end of the vent pipe 104, were the latter not extended to above the level of lubricant in the reservoir.

Thus, in operation, the gear pump forces substantial volumes of lubricant under pressure into the pipe line periodically at intervals. Accordingly, simultaneous opening of the spring-seated relief valves of the drip plugs is assured by building up pressure in the distributing system, substantially in the same manner as in my prior Patent No. 1,632,771.

I have shown various embodiments now to be described for the different main constituent elements making up my system, and these may be used more or less interchangeably.

While valve 64 prevents drain of the reservoir contents as long as the system is out of operation, it is ineffective to preclude drain of the distributing system through a defective drip plug or a break in the line. By providing the gear pump 95 with a check valve 108 seated by spring 109, venting of the distributing system at its head is avoided and drainage of the system precluded. Valve 108 is closed at all times except while the gear pump 95 propels oil.

The embodiment of Fig. 2, indicating illustratively the lubrication of a press, is similar to that of Figs. 1 and 4. The reservoir R' is of larger volume than that of Fig. 1. While the force pump 50' in Fig. 1 is shown at level above all or most of the bearings, the force pump 50² of Fig. 2, which may also be a gear pump, is shown near the bottom of the machine, and transmits pressure through the oil filled piping extending thereabove. The diagram shows no means for shutting off the reservoir when the mechanism comes to rest, but this may be of the same construction as in Fig. 4, or of any of a wide variety of other constructions, some of which are shown in Figs. 11 to 20, to be described hereinafter.

In Figs. 6 to 9 are shown alternative constructions of thermostatic drip plugs to control the rate of drip from the reservoir to the volume collector. In the embodiment of Fig. 6 a cylindrical casing 110 is provided with a head 111, affording a conical outlet 112. The upper head 113 of the cylinder clamps in position an apertured washer 114, having a bushing 115 into which is threaded as at 116 and secured by nut 117 a rod 118 of a material such as vulcanite having a high positive coefficient of expansion. The rod 118 has a conical lower end 119 for co-action with the conical valve seat 112. The head 113 has a socket 120 serving as a nipple for attachment of the feed pipe 77 and housing a felt strainer inlet plug 121. In operation, as the temperature drops, the vulcanite rod will contract and correspondingly increase the cross-section of the opening between end 119 and seat 112, for maintaining more nearly uniform the rate of drip from the reservoir under changing temperature and viscosity conditions.

The embodiment of Figs. 7 and 8 shows another construction of thermostatic drip plug comprising a flat casing 122 having a stud 123 threaded thereinto, mounting the hub 124 of a sector gear 125, meshing with a pinion 126, which is lodged against endwise displacement in a cavity 127 in the bearing block 128, within casing 122. The pinion 126 is threaded upon a rod 129 which has a taper pin 130 at its end fitting in a corresponding tapered outlet in a bushing 131 in the casing.

A thermostatic spiral strip 132 is secured at one end to the hub sleeve 124 and fixed at the other end by a screw 135 to the casing 122. The casing has a cover 134 bolted thereto and affording a mount for the stud 123 and for the rod 129 and having a lubricant inlet 136. The bearing block 128 has radial inlet bores 137 for the feed of lubricant from the interior of the casing to the drip outlet 130.

In operation, lubricant admitted through socket 136 will pass into the cavity of casing 122 and through bores 137 past the lubricant outlet 130 to the collecting chamber C' affixed therebelow. With decrease in temperature, the spiral thermostatic strip contracts to revolve the hub 124 and with it the segment gear 125 to rotate the pinion 126 and correspondingly feed the taper pin 130 outward or upward to enlarge the effective area of the bore.

In Fig. 9 is shown another embodiment comprising a casing 138 having a thermostatic strip 139 fixed at its outer end by a screw 140 to the base of the casing and fixed at its inner end to a sleeve 141 pivotally encircling a fixed pin 142. The sleeve 141 mounts an arm 143 having an operating yoke 144 at the outer end thereof. The operating yoke embraces a pin 145 and extends between a pair of disks 146 and 147 secured to said pin. The pin is slidable in a bore 148 at its upper end and has a tapered lower end 149 in the restriction bushing 150. With contraction of the thermostat under drop of temperature, the pin 149 is, accordingly, lifted through yoke 144 for corresponding decrease of resistance to drip.

In Fig. 10 is shown a modification of the system of Fig. 4. In this embodiment, the gear pump 151 is identical with that of Fig. 4, except that it is not provided with a vent. The objectionable suction of the pump upon the collecting vessel 152 or siphon 153 is avoided by subjecting both ends of the siphon simultaneously to the suction effect of the pump, so that effective suction does not occur. For this purpose, the collecting chamber is divided in two and includes an upper compartment 154, separated by wall 155 from the lower compartment 152. The siphon branch 153 corresponding to 91 in Fig. 4 extends downward through the wall 155 into the lower compartment and terminates immediately above the outlet therefrom. The upper compartment is vented through a vent pipe 156 extending upward therefrom into the vented reservoir and terminating near the top of the latter. The lower compartment 152 of the siphon is vented through a vent pipe 157 extending thereinto through partition 155 and terminating at its upper end within the upper compartment, for venting communication with the pipe 156.

In the present embodiment, I have illustratively shown instead of the thermostatic drip plug of Fig. 4, a water jacketed drip plug 158. The lower end of the reservoir is made with a deep annular jacket 159 supplied through an inlet pipe 161 and delivering through an outlet pipe 160. This heating jacket encircles drip plug 158 which is fixed within the axial bore 162. In motor vehicle application, the heating jacket 160 would be connected to the hot water of the cooling system or to the hot gases of the exhaust and will tend to maintain the drip plug at a more nearly uniform temperature for approximate constancy of drip, with varying temperatures of the oil.

In Figs. 11 to 13 is shown another embodiment of lubricant supply installation, in which the various constituent elements including the reservoir, the collector and the force pump are all embodied in a single unitary construction, instead of being distributed at different parts of the mechanism as in the showing of Figs. 1 to 10. While the application now to be described is useful for automobile lubrication, it is more especially intended for machine shop installations. In the present embodiment, the reservoir R has a cast base piece 165 within which the gear pump 166 is mounted, a cover 167 securing the latter in place.

As in Fig. 4, the reservoir has a filter 168 through which the oil is cleaned on its way to valve 169 to which it passes through bore 170 and through port 171 in the sleeve 172, which encircles valve 169 and prevents the flow of unfiltered oil therepast, either to the collector or to the gear pump. The valve 169 is similar to that of Fig. 4, and has a head 169' sliding snugly in sleeve 172 and includes the operating rod 198 which protrudes through the cover of the reservoir. The base plate has an outlet socket 165' to which the head of the distributing system is connected with the gear pump. As in Fig. 4 the gear pump has a safety valve 173, normally closing a by-pass 174, and in this instance, inserted through the top of the base piece and maintained in position by a plug 175 therein.

The gear pump is driven by means of a vertical rod 176 extending the height of the reservoir and in turn operated by drive mechanism connected to the drive shaft of the machine. The pump driving transmission illustratively comprises a pair of miter gears 177 and 178, the former pinned to the upper end of the shaft 176, the latter mounted on a sleeve 179 encircling rod 180 and driven by the belt 181 about the pulley 182 mounted upon the sleeve 179.

The collector in this case also illustratively shown of the siphon type, includes a cylindrical casing 183 connected directly in the base piece 165, at a collar flange 184 soldered thereto and bolted at 185 to base piece 165. The siphon chamber is generally similar in construction to that of Fig. 10 and comprises an upper chamber portion 186 and a lower chamber 187 separated by a partition 188. The siphon pipe 189 extends with its longer arm downward to near the bottom of the lower chamber, and its shorter arm 190 terminates above the bottom of the upper chamber. The upper chamber is vented through a vertical bore 191 in the base piece 165 and a vent pipe 192 extending upward to near the top of the reservoir, which latter is vented in the usual manner through the filler cap (not shown).

The lower chamber 187 is vented through a vent pipe 193 with its lower end opening through the partition 188 and extending upward to substantially the bore 191 in the base piece 165. A suction tube 194 of smaller diameter extends substantially the entire height of the collector cylinder and communicates at its upper end with a vertical bore 195 in turn communicating with a bore 196 leading to the gear pump 166.

I have shown only the exterior of the drip plug 197 below valve 169, controlling the rate of admission from the reservoir R to the collector chamber 186. This drip plug may be of any of the constructions shown in Figs. 4 to 9.

For controlling the opening and closing movement of the valve 169, I have illustratively shown centrifugal governor means. The upper end of valve rod 198 is connected at 198' to a bell crank lever 199 pivoted at 200 to a frame structure 201 mounted on the reservoir and connected at its other end at 202 to the slide rod 180 which protrudes at its other extremity into the casing 203 of a centrifugal governor, said casing illustratively constituting one of the walls of the pulley 182. The centrifugal governor comprises a pair of weights 204 and 205 pivoted at fingers 206 to brackets 207 on the casing wall. The ends of the fingers 206 extend into a peripheral groove 208 about the end of the slide rod. The balls 204 and 205 are normally drawn together by a connecting coil spring 209. In operation of the mechanism, the balls 204, 205 fly outward and thereby draw the fingers 206 to the left, pulling the slide rod 180 outward, turning the bell crank lever 199 in counterclockwise direction, lifting the rod 198 and with it the valve 169. As long as the mechanism is running, the valve thus remains open but when operation ceases, the spring 209 draws the balls 204, 205 together and causes the parts to return and the valve to re-seat.

Means is provided for lubricating the control mechanism of the reservoir. This means may simply comprise a wick 210 extending upward from near the bottom of the reservoir R, through the transmission bracket 201, and coiled about the sleeve 179, which latter has one or more radial openings 211, delivering to a reduced portion 212 of the slide shaft 180, which latter has radial bores 213 and a longitudinal bore 214 through which the lubricant is delivered to the bearings of the slide shaft and of the centrifugal operator.

As the chamber 186 becomes filled to a definite level above the top of the siphon 189 due to drip through plug 197 while the mechanism is operating and valve 169 consequently open, the siphon will draw the lubricant from the upper chamber 186 through the pipe 189 and deliver it into the lower chamber 187. The chamber 187 being vented, such collected lubricant will readily be sucked up by the continuously operating gear pump 166, which delivers the lubricant to the distributing system in the manner previously described. Thus, in this embodiment also, the lubricant continuously dripping from the reservoir is integrated or collected, and substantially metered volumes are intermittently delivered to the force pump, which, in turn, propels such lubricant to the distributing system. It will be understood that the gear pump will not exert any suction effect upon the siphon 189, since both ends of the latter are vented, so that no lubricant can be fed or sucked to the continuously running gear pump until the substantial volume has accumulated in the collector 187.

In Fig. 14 is shown another embodiment of unitary construction of a supply installation, which like that of Figs. 1 to 13, is more especially useful for machine lubrication although it also may be embodied for chassis lubrication. In this construction, the reservoir R of generally conventional construction, like that of Figs. 1 to 13, has a filter 220 at the bottom thereof, through which the contents seeps into the removable cup 221 therebelow, which cup is provided with radial apertures 222 through which lubricant passes to the collecting chamber. To reduce the length or height of the device, an Archimedian lifting screw 224 is illustratively provided, to raise the lubricant to the elevated collecting chamber 223. The screw 224 bears at its lower end 226 in the base 225 of the reservoir and at its upper end in a bearing structure 227 at the top thereof. Lubricant previously filtered into the chamber 221 is thus continuously lifted to chamber 223, during operation of the mechanism. The chamber 223 is provided with a spillway 228, whereby the lubricant is maintained at a constant level therein. The lubricant drips from the chamber 223 through a drip plug 229 which may be of any of the constructions shown in Figs. 4 to 9, into the upper siphon chamber 230 from which the siphonic tube 231 extends downward into the lower section 232 of the siphonic chamber. A vent tube 233 opening at its upper end to atmosphere, communicates at its lower end through dividing wall 234 with the lower collecting chamber 232 and has one or more lateral openings 235 through which the upper chamber 230 is vented. In the base hub 225, is provided the force pump 236, in this embodiment, also shown as a gear pump, supplied through an oblique bore 237, from collecting chamber 232 and delivering through an outlet socket 238 to the distributing system. The gear pump is preferably, as in other embodiments, provided with a safety valve which in this instance is not shown.

The driving gear of the pump is preferably affixed directly upon the lower end of the conveyor screw 224, and both said screw and the gear pump are driven by power supplied through pulley 239, turning in bearing 240 at the top of the reservoir and having a miter gear connection 241 with the upper end of the conveyor shaft 224.

The operation will be apparent from the above description, but it may be briefly noted that throughout the operation of the mechanism a continuous supply of filtered lubricant is continuously lifted to the spill chamber 223, which is always maintained charged to the spill edge 228 from which excess continually overflows back into the reservoir. Thus, a constant head of lubricant is maintained above the drip plug 229, which delivers at constant rate into the collecting chamber 230 therebelow. When the latter is filled to a predetermined level, the volume thereof is drained by siphon 231 and fed to the continuously operating gear pump 236 which thus discharges under pressure into the distributing system.

In Fig. 15 is shown an alternative arrangement of reservoir valve control, more especially for chassis lubrication, in which instead of the electromagnet of Fig. 4, or the centrifugal means of Figs. 11 to 13, for maintaining the valve unseated during operation, I employ suction from the intake manifold. Illustratively, screws 245 clamp a diaphragm 246 and an enclosing connecting cap 247 to the top of the reservoir R. The connection pipe 248 from the intake manifold (not shown) is coupled to the cap 247. The valve rod 250 is secured centrally to the diaphragm 246, preferably by a pair of nuts 251 threaded thereon at opposite faces of the diaphragm, the upper nut preferably reacting through a dished washer 252 to maintain the central part of the diaphragm relatively stiff. A spring presses downward against the upper face of the diaphragm 246 with which it is correlated by an upstanding rim 252' on washer 252 and it reacts against cap 247.

Preferably the diaphragm is maintained dry and free from contact with the oil by a tube 253 encircling the rod 250 and soldered at its lower end into the reservoir base piece 254 and at its upper into the center of a dished washer 255, maintained against the lower face of the upper wall of the reservoir by soldering, and accommodating the ends of the screws 245.

In operation, suction from the manifold will cause the diaphragm to flex upward and to raise the valve and maintain it raised throughout engine operation.

In Figs. 16 and 17 is shown another arrangement for controlling the slow feed of lubricant from the reservoir, and applied to a machine or mechanical installation, illustratively a milling machine. The pressure generated in the cutting or circulating oil circuit is here employed, for maintaining the lubricant supply valve open.

The reservoir R is shown in outline, illustratively at relatively high level and may be of construction generally similar to that of Figs. 4 and 10. The pressure from the cutting or circulating oil circuit is applied to a diaphragm 260 controlling the valve. In this embodiment, since the diaphragm is subjected to pressure during operation rather than to suction as in Fig. 15, a reversing connection is provided to cause the valve 261 to move upward when the diaphragm is flexed downward under pressure. For this purpose, the valve 261 has a short rod 262 sliding through a gland 263 in a short sleeve 264. The sleeve 264 mounts a bracket 265 mounting the fulcrum 266 of a lever 267 pivoted at one end to the rod 262 and at the other to vertical rod 269, attached to diaphragm 260. The lower end of rod 269 preferably slides in a bore 270 in the reservoir base and is held against rotary displacement by a pin 271 protruding into a corresponding groove 272 in the rod 269.

Preferably the diaphragm has a metal cup 273 therebelow, screwed to the reservoir cover 275 and accommodating a coil spring 274, reacting against a dished washer 276 normally against diaphragm 260 and maintaining the latter flexed upward and the valve 261 seated. Washer 276 and a companion washer 277 at the upper face of the diaphragm clamped against the diaphragm by nuts 278 threaded upon the shaft 269 maintain the middle of the diaphragm relatively rigid.

The cutting or circulating oil pump is indicated at 279 and the cutting oil feed conduits are shown at 280. A branch pipe 281 from said feed conduit is connected by coupling 282 to the socket 283 on the hood 284 secured by screws 285 over the diaphragm 260 for effective application of the pressure of the cutting oil, to cause the diaphragm throughout operation of the mechanism to be depressed and to thereby maintain the valve 261 in open position. The expansion of spring 274 causes valve 261 to reseat when the cutting oil pump ceases pressure generation upon stoppage of the machine.

In the fragmentary view of Fig. 17a is shown a simplified arrangement for operating the valve from the diaphragm. It will be understood that the fragment shown is to be substituted for the valve operating construction in the arrangement of Fig. 17. In this case, the valve 261' is at the lower end of the rod 269' and coacts with the seat 261² thereabove in contact with which it is kept while the spring of the diaphragm (Fig. 17) is extended, but from which it is displaced by depression of the diaphragm, while the mechanism is operating.

In Fig. 18 is shown another embodiment for automatically shutting off gravity flow from a reservoir, as soon as the mechanism stops, the flow being maintained throughout operation of the mechanism. In this embodiment, I have shown the reservoir mounted substantially below the end of a revolving shaft 290 of the mechanism. Upon the extremity of said shaft, is mounted a collar 291 secured by a set screw 292 and in turn mounting the casing 293 of a centrifugal governor embodying two or more balls 294 pivoted at 295 at their tails 296 to brackets 297 in the casing 293 and having inturned fingers 298 reacting against a plunger 299 protruding outward from the bushing 300 on the end face of the casing, but urged inward by a coil spring 301 encircling the plunger and reacting against the head 302 thereof. The housing 304 of the machine mounts an L-bracket 305, to the lower end of which is pivoted a small bell crank lever 306, engaged at its shorter arm 307 by the extremity of the plunger 299. The longer arm 306 is connected by means of a flexible cable 309 to the upper protruding end of the valve rod 310 in the reservoir R.

During operation, the balls 294 will fly outward and remain outward, drawing the fingers 296 to the left, pushing the plunger 299 outward against the resistance of spring 301, thereby raising the outer end of bell crank lever 306 and correspondingly lifting the valve rod 310 by tension transmitted through the flexible cable 309. When the mechanism stops, the spring 301 expands, returning the balls 294 and releasing the bell crank lever 306, so that the valve by virtue of its weight and/or an associated spring (not shown) is urged back to seated position.

Figs. 19 and 20 show another arrangement for controlling the delivery from the reservoir during operation of a machine or installation, in this embodiment, by interlock with the belt shifter. Illustratively, the valve rod 316 is screwed at 316' into a block 317 slidably mounted in a bushing 318 fixed into the top of the reservoir R. The end of the rod presents a shoulder at the threaded extremity, serving to clamp in position a dished washer 319 which mounts the lower end of a coil spring 320 encircling the bushing and serving normally to maintain seated the valve 169' at the lower end of rod 316. The block 317 is preferably provided with an integral eye 321 extending above the reservoir and registering with the tapered end 322 of the belt shifter 323, the upper edge of which tapered end is in contact with the straight-edged part 324 of the eye 321. Obviously, as the belt is shifted, the eye is raised and the valve unseated. When the shifter 323 is returned to stop the mechanism, the eye 321 is correspondingly released and the spring 320 permitted to reseat the valve.

Other collector constructions

While, in general, I prefer the siphoning means for collecting or integrating the volume from the reservoir, prior to delivery to the force pump, I have shown a number of alternative collecting or integrating constructions now to be described.

In Fig. 21 is shown a float control arrangement for this purpose. The collector vessel 326 has an outlet 327 affording a seat to be closed by a valve 328 provided with an upstanding rod 329. The vessel has a false bottom 330, serving as the guide for the rod 332 of a float 331 therein, which is arranged to effect opening of the valve when the lubricant in the collecting chamber has reached a predetermined level. While any of numerous linkages may be employed for effecting the release, I have illustratively shown one specific embodiment. A bracket 334 is mounted to the top of the reservoir and serves as the pivot mount 335 of a spring toggle having one of its arms disposed as a yoke 336 mounted between a pair of cross pins 337 near the upper end of the rod 329. The end of arm 336 is connected by springs 338 to the extremity of the other toggle arm 339. The toggle is actuated from the float 331 through connecting linkage comprising a leverage 340, secured at one end to bracket arm 341, and at the other to the float at 342. A link 343 joins the intermediate part of lever 340 with the link 339 of the toggle. The valve 328 is normally maintained closed by the reaction of the toggle arm 336 against the lower pin 337 due to the force exerted by spring 338. As lubricant collects in chamber 326, the float 331 rises and the lever 340 is slowly drawn upward, correspondingly raising arm 339, until the spring 338 is drawn past pivot pin 335, whereupon the yoke 336 of the toggle sharply engages the upper pin 337 and raises the valve rod 339 to cause discharge of the contents of the float chamber. When the latter has discharged, the float has dropped and restored the linkage to the position of valve seating for collection or integration of another charge of lubricant preparatory to another discharge.

In Figs. 22, 23 and 24, the collector comprises a hollow illustratively a frusto-conical valve 245 having a single port 346 communicating in its upper position with lubricant from the reservoir R thereabove and adapted to empty its charge in lower position through port 347 for delivery to the gear pump 348. While means may be provided for quickly shifting the valve from one position to the other, at intervals of substantial length, I have indicated a gear reduction arrangement for revolving said valve so slowly that it becomes sufficiently charged by the drip from he reservoir thereabove before it is shut off from communication therewith. Illustratively, the valve is mounted in a corresponding casing 349 and pressed by a coil spring 350 reacting against a hollow screw cap 351, into sufficiently tight engagement with the wall or casing 349. Upon the extremity of the valve 345 is mounted a worm wheel 352 meshing with a worm 353 upon a shaft 354, upon the outer end of which shaft is mounted another worm wheel 355 meshing with a worm 356 driven from the speedometer shaft 357 or other rapidly revolving mechanism.

By the arrangement described, it will be understood that the same amount of lubricant is fed to the bearings regardless whether the vehicle is operated at high speed or at low speed. With increase in speed of the vehicle, the valve is, of course, more speedily revolved and though the collected volume of lubricant may be correspondingly decreased, the frequency of injection will be correspondingly increased, and the rate of drip is so adjusted that a substantial volume will be collected in the hollow valve for each discharge even under the highest speed of operation. The gear pump 348 in this embodiment is preferably driven direct from the speedometer shaft 357 and is provided with the vent tube 358 and the by-pass valve 359 as in Fig. 4.

In the embodiment of Fig. 25 is shown an arrangement more especially useful for stationary machine lubrication. The collector chamber 365 supplied from the reservoir R by gravity flow has a tilting twin-bucket construction, comprising a flat bottom 366 triangular lateral walls 367 connected by an upstanding wedge-shaped dividing wall 368, determining the twin-buckets 369 and 370, either one or the other of which will be normally located immediately below the outlet of the feed pipe 371. As drip from the reservoir collects in the registering bucket 370, the latter will in time be sufficiently filled to tilt over by gravity, to engage stop 372, and discharge its contents into the collecting chamber 365, for immediate drain to the force pump (not shown) in the manner previously described. By this operation, the companion bucket 369 is brought into alignment with the outlet of pipe 371. Bucket 369 upon filling, discharges its contents and again restores the first bucket for interception of drip. Thus, integrated volumes are discharged at substantial intervals.

Preferably the drip plug 373 has a nozzle pipe 374 protruding below the cover of the collector 365, thereby to assure drip into the registering bucket and to preclude possible lateral flow along the ceiling of the collector.

*Alternative force pump arrangements*

In Figs. 26 to 28 is shown a specific construction and arrangement of gear pump on the end of a lighting generator shaft, such as diagrammatically indicated at 59 in Fig. 1.

I have shown a fragment of the conventional generator 375 illustratively with a ball bearing 376. A pump mounting base 377 is affixed by a plurality of screws 378 threaded into the generator head 379 and exerting thrust upon an interposed protective sleeve 380. The gear pump comprises a pair of gears 381 and 382 disposed in corresponding cavities in the outer face of the base 377, the driven gear having a stud shaft 383 and the drive gear having a driving shaft 384 with a bearing in a corresponding hub 385 rendered oil-tight by a gland 386, and having a coupling piece 387 retained on the inner end thereof by a set screw 388 and releasably correlated for clutching connection with a corresponding notch 389 on the extremity of the generator shaft. The case of the gear pump is closed by a cover piece 390 screwed as at 391 to the base 377 and affording an inlet socket 392 for the feed pipe and an outlet socket 393 leading to the distributing system. The by-pass 394 from the inlet to the outlet side of the pump, as in other embodiments is normally closed by a safety valve 395 seated by spring 396 which reacts against a threaded closure plug 397, all of said parts being shown in the present embodiment within the cover plate 390.

The gear pump could be mounted, if desired, on any other running accessory of the vehicle or other mechanism. It might, for instance, be mounted on the water pump on the ignition head or on the fan.

I have shown in Figs. 29 to 31a a specific alternative arrangement of chassis gear pump in association with the usual engine lubricating gear pump.

The substantially conventional gear pump is shown, embodying a casing 400—400' into the hub 401 of which extends drive shaft 402 coupled at 403, to the stud 404 of the driving gear 405 of the gear pump, which meshes with the driven gear 406. To the engine gear pump is bolted a cover plate 407, which, in this construction mounts the chassis lubricating gear pump. Illustratively, the cover 407 has a pilot 408 tightening a gland 409 about the engine pump shaft 404. The driving gear 410 of the chassis pump is coupled to said shaft end. The driving gear 410 and the driven gear 411 are lodged in a corresponding depression in cover 407 and both have bearing studs 412 lodged in corresponding depressions on the closure 413 of the chassis gear pump case. The base 407 of the chassis pump has an inlet socket 414 for connection to the feed pipe and an outlet socket 415 to which is to be connected the head of the distributing system. The by-pass of the chassis gear pump for preventing excessive pressure on the line is in this case substantially as in that of Figs. 26 to 28, disposed in the cover plate 413 which has a pair of bores 416 and 417, through the thickness of said plate communicating with opposite sides of the gear pump, and a transverse connecting bore 418 normally closed by the safety valve 419 seated by spring 420 and reacting against the closure plug 421.

In the construction shown, the engine lubricating pump and the chassis lubricating pump are sealed with respect to each other, so that the former operates exactly as heretofore, drawing the lubricant from the engine sump while the latter, though immersed in the engine oil, will have fed to it, and will discharge only lubricant derived from the source R and C (Fig. 31a) for chassis lubrication.

In Figs. 32 and 33 is shown another arrangement for the force pump of a system of the general type shown in Fig. 1, in this case for operation from the speedometer drive. Preferably the pump is embodied in a casing unit 426 interposed between the terminal 427 of the speedometer drive shaft 428 and the speedometer take off 429, both of which latter elements are of conventional construction. The casing 426 embodies a unitary piece with one end flange 430 screwed at 431 to the speedometer take off and the opposite end flange 432 thereof attached by screws 433 to the flange of the drive terminal 427. The unit 426 has a connecting drive shaft 434 longitudinally therethrough, coupled at one end to the flexible drive shaft and at the other to the spiral pinion shaft 435 of the speedometer takeoff. In counterbored sockets within the outer face of the pump unit 426 are the gears 436 and 437 of the gear pump, the former of which is rigidly affixed to the shaft 434. Leak of lubricant from the gear pump along the shaft is prevented by glands 438 at the opposite sides of the gear pump and encircling the shaft 434, each of said glands tightened by a corresponding bushing 439 urged inward by a coil spring 440 reacting against the contiguous structure. In the embodiment shown, the case 426 has an inlet 441 through which lubricant from the supply is fed to the gear pump and an outlet 442 preferably at the same side of the gear pump casing, distributing to the system. The gear pump is provided with a by-pass comprising a pair of bores 443 and 444 illustratively aligned respectively with the inlet and outlet sockets and connected by a transverse bore 445 normally shut off by a spring-seated safety valve 446 retained in position by a closure plug 447 as in the other embodiments.

In Figs. 34 and 35 is shown an alternative force pump installation of the plunger type, associated with the speedometer drive. As in the embodiment last described, the pump is enclosed within a unitary casing 450 interposed between the speedometer transmission bearing retainer 451 and the terminal 452 of the speedometer drive shaft 453. The casing is provided with a laterally extending pump cylinder 454 within which extends the plunger 455 which in the suction stroke draws its charge from the source of supply past an inlet check valve 456 in a laterally extending fitting 457, to which is coupled the inlet pipe 458. The pump ejects its charge past a corresponding check valve 459 within a fitting 460 opposite the inlet and leading to the distributing system (not shown).

The pump plunger has an extension 461 in a closure plug 462, screwed into the opposite end of the casing 450. The plunger is driven through speed reduction mechanism coupled to the flexible drive shaft 453. For this purpose, the drive shaft is provided with a worm 462 within the casing 450 meshing with a worm wheel 463 affixed to a transverse cam shaft 464 bearing at one end in the casing 450 and at the other in a closure cap 465 which closes the opening through which said shaft is inserted. The cam 466 on the shaft fits in a corresponding cam ring 467 formed on a rigid part of the plunger 455 intermediate the ends thereof and provided with a flattened upper part 468 against which the cam lobe 469 reacts to lift the plunger. A spring 470 coiled about shaft extension 461 urges the pump plunger to discharge position.

In operation, the piston is continuously reciprocated at a rate determined by the speed reduction 462—463, and, whenever a charge of lubricant has been released from the collector as in Fig. 1, for instance, the continuously reciprocating pump 455 will, by a succession of strokes, eject such charge into the distributing system, valve 456 preventing return flow on each discharge and valve 459 return flow on each charge stroke.

While I have shown the check valve 108 at the head of the distributing system in the embodiment of Fig. 4 and not in the other embodiments thus far described, it will be understood that a similar check valve is preferably provided for the gear pump or other force pump in each of said embodiments, in order to preclude venting of the head of the distributing system.

In Figs. 36 and 37 is shown another arrangement of pressure pump suitable for a system of the type shown in Figs. 1 to 9 and shown illustratively as a plunger pump. The lubricant force pump is here embodied in a unit with a mechanical fuel pump, which latter in itself is not my invention.

In the drawings, I have shown the casing 475 of the fuel pump embodying the diaphragm 476 at the upper part thereof urged outward by a coil spring 477 reacting against the guide 478 of a rod 479 on the diaphragm. The rim of the diaphragm is clamped in position by a cover plate 480 mounting the liquid intercepter 481 and providing a fuel inlet at 482. As long as a substantial fuel pressure exists at the head 480, the diaphragm 476 is depressed and the toggle, made up of links 483 and 484 is collapsed. A bell crank lever 485 pivoted in the case at 486 and having a tappet 487 coacting with a cam 488 on the cam shaft will, accordingly, operate idly. As soon, however, as the fuel pressure drops, the spring 477 urges the diaphragm 476 outward, expanding the toggle 483—484, so that in subsequent oscillation of the bell crank 485, the diaphragm 476 will perform a fuel pumping action, until the pressure has again risen sufficiently to depress the diaphragm and cause collapse of the toggle.

With the construction thus far described, which in itself is not my invention, I embody my chassis lubricating pump for operation from the same bell crank lever 485. For this purpose, a casting 489 is secured by screws 490 to the lower flange of the fuel pump case 475, and affords a cylindrical bore 491 for a pump plunger 492 therein, connected at its upper end by a ball and socket joint 493 to a link 494, pivoted at 495 to a lug 496 at the lower edge of the bell crank lever 485. The casing 489 has a socket 497 for the inlet or lubricant supply pipe 498 communicating with the lower end of the pump cylinder 492, and a similar outlet nipple 499 which may be aligned therewith to which the distributing system (not shown) is to be coupled. Preferably a coil spring 500 is lodged against the base of the casting 489 and reacts against a thrust washer 501, on the downwardly extending lug 502 on the extremity of the ball crank lever 485.

In operation, the lubricant pump will be continuously reciprocated throughout running of the engine, and will draw and feed lubricant under pressure as long as a supply is fed thereto, as from the system or arrangement disclosed in Figs. 1 to 9.

In Figs. 38 to 40 is shown another embodiment suitable for chassis lubrication and for other purposes, in which the reservoir, the collector and the force pump are all combined in a unitary construction. In lieu of the gravity drip feed from the supply reservoir, a servo-pump is here provided, to effect the continuous supply to the collector.

In the present embodiment, both the servo-pump, which supplies the collector and the force pump which injects charges into the distributing system, are operated from the same instrumentality, illustratively shown as a connection to the vibrating vehicle spring.

The reservoir R is illustratively provided with a filter capsule comprising a cover cap 510 soldered into a downwardly extending flange 511 in the reservoir base and an upwardly threaded bottom cap 512 having a sheet metal skirt 513 therein clamping the rim of the filter disk 514 against the flange 515 of the cover cap 510. The cover cap has apertures 516 below the filter disk, through which the lubricant seeps into the cavity therebelow and from which cavity the filtered lubricant is drawn by suction into the servo-pump 517. An assembly of servo-pump, force pump and siphonic collector element embodied in a unitary casting 518 is mounted directly upon the filter capsule preferably by centrally swaging the central part of cap 510 thereto as at 519. The servo-pump comprises a pin or rod 520 of small diameter, slidably mounted in a corresponding vertical bore in the casting 518 and drawing its charge past the filter 514 through a suction valve inlet plug 521 threaded into the lower end of the casting 518.

The force pump comprises a plunger 522 of larger diameter than that of the servo-pump, parallel therewith and fitting in a corresponding bore 523 in the casting 518. The force pump derives its charge from the collector chamber 524, also within the casting 518, which chamber will be hereinafter described, and emits past the check valve 525, through a laterally extending nipple piece 526 to which the distributing system is connected. Reverse flow from the pump to the collector chamber 524 is prevented by an interposed light, stamped metal check valve 559 with outwardly projecting stop fingers 559'. This valve is shown devoid of a spring, to open readily in the upstroke of the pump and its movement away from its seat is limited by engagement of fingers 559' with gaskets 576 interposed between the pump cylinder and the plug 577 that provides the valve seat 578. The valve 559 is securely seated by the pressure exerted in pump discharge.

The servo-pump 520 has an operating rod 527 connected thereto by a ball and socket joint 528 and the force pump plunger 522 has a similar rod 150

529 similarly connected, both rods extending upward through the cover of the reservoir. Each rod has a sleeve 530 pinned thereto as at 531 and a coil spring 532 encircling the rod reacts against the sleeve and against the reservoir cover and normally urges the respective pumps to discharged position.

For reciprocating the two pumps, I have provided an instrumentality now to be described, comprising a generally horizontal lever 533 pivoted to a cross pin 534 mounted in a bearing bracket 535 screwed at 536 upon the reservoir cover. The lever 533 is reciprocated by the movement of the vehicle spring 537 which has a bracket 538 connected to the outer end of the lever 533 by a connecting coil spring 539 coupled at its extremities to studs 540 and 541 respectively clamped by nuts 542 to the bracket 538 and to the lever 533. The lever 533 is normally urged upward by a torsion spring 543 encircling the pivot pin 534 and reacting against the top of the reservoir. The thrust of the lever 533 is transmitted for operating the respective pump rods, through a transmission plate 544 also pivotally mounted on pin 534. The path of displacement of transmission plate 544 is limited by nuts 545 and 546 adjustably disposed at opposite sides of the plate 544, by mounting upon a threaded stud 547 secured by nuts 548 into the top of the reservoir. The lever 533 is cut away at 549 to clear the nuts.

The siphonic chamber 524 is supplied from the servo-pump 520 through a horizontal bore 550 communicating with a vertical bore 551 into which is connected the stand pipe 552. the upper end of which protrudes through a transverse partition 553 therein. The short dropping end 554 of the siphonic tube is aligned with the upper end of the stand pipe 552 and the longer arm 555 of the siphonic tube extends downward into the collector chamber 524 below the transverse partition 553. The usual siphon breaker section 556 is provided and the vent tube 557 as in the other embodiments.

In operation of the vehicle, the continual oscillation of the vehicle spring will correspondingly draw down the lever 533 which by its pivotal engagement can freely slide with respect to the transmission plate 544 at the contact boss 558. In the downward depression, the transmission plate 544 is caused to pivot about its mounting pin 534 until it is arrested by the nut 545. In this downward movement of the corresponding part of plate 544, the servo-pump 520 is released, permitting its spring 532 to expand, to effect discharge through the bores 550 and 551, and standpipe 552 into the siphonic collecting chamber. In the upward movement of the outer part of plate 544, the force pump 522 is drawn upward or charged. In the flexing return of the vehicle spring 537, the torsion spring 543 returns the lever 544 to the position shown in Fig. 38. The spring 532 is thus released to discharge force pump 522. As soon as the chamber above partition 553 has substantially filled, the siphon 554—5 will withdraw the charge downward into the lower chamber 524 affording a supply of lubricant therein, on which the force pump 522 draws in the continual reciprocations thereof, admitting the charge through port 558 and then forcing said charge through the outlet 526 into the distributing pipe system. The force pump reciprocations perform no useful work, except as long as there is oil in collector chamber 524.

It will be seen that the flexible transmission spring 539 from the vehicle spring 537 will yield to permit excess downward flexure of the latter after the lever 533 and the transmission plate 544 have been arrested by contact of the latter with the nut 545. The spring 539 readily yields and flexes to prevent transmission of any excess strain to the pump operating means during the upward flexure of the vehicle spring.

In Fig. 41 is shown a modification of the operating construction of Figs. 38 to 40, in which the use of a separate transmission plate is dispensed with, the operating plate 560 being pivoted to ears 561 as in the other embodiment. The operating rods 562 and 563 of the servo-pump and of the force pump respectively, extend through corresponding apertures in the top plate 564 and have nuts 565 and 566 threaded at the outer ends thereof, reacting against said lever. The stop nut stud 567 is similar to that of Fig. 38. The operating connection between the vehicle spring (not shown) and the plate 560 is in this embodiment shown as including a length of flexible cable 568 to the upper eye 569 of which is connected the hooked end 570 of a short coil spring 571, the upper end of which is similarly hooked at 572 into an eye 573 at the lower end of a threaded stud 574 secured by nuts 575 to the end of the operating lever 560.

While I prefer to embody the various instrumentalities described, and shown in Figs. 15 to 37 for operation in composite pressure systems operating on the principle shown in Figs. 1 to 14 it will be understood that many of the individual elements disclosed are applicable for other types of systems. For instance, the various elements shown in Figs. 4 to 20 independent of the pump and collecting means are useful in ordinary gravity systems, to effect continuous drip throughout the running of the mechanism. Similarly the pumping instrumentalities of Figs. 4 to 41 are useful in pressure systems for effecting continuous propulsion of lubricant or other fluid under pressure to distributing systems. The pump arrangements of Figs. 26 to 37 are applicable, for instance, to lubrication of systems of the type disclosed in my copending application, Serial No. 285,526 filed June 15, 1928 in which the drip plugs present little or no spring resistance. It will also be understood that it is feasible for gravity lubrication or other fairly constant pressure lubrication to embody any one of the drip control devices of Figs. 3 to 10 with the volume collector of any one of Figs. 21 to 25 in order to intermittently and automatically feed a volume of lubricant for propulsion by gravity to the various places at which it is to be used.

It will be understood that in lieu of the vehicle spring operated pump shown in Figs. 38 to 41, I may employ an inertia weight operated embodiment of any of the types disclosed in my copending application, Serial No. 285,526 filed June 15, 1928. It will also be understood that such inertia weight operated embodiment may be utilized for intermittently opening and closing the supply valve controlling emission from the reservoir. It is also to be understood that the solenoid-control of Fig. 4, the centrifugal-control of Figs. 11 and 18, the fluid-pressure control of Figs. 15 and 17, and the mechanical control of Figs. 19 and 20 for the outlet valves of the reservoir may also be attached to other reciprocating control devices as in the case of Figs. 34 and 35.

While the invention is more especially applicable to lubrication, it will be understood that certain of the principles thereof are useful in

I claim:—

1. In a central lubricating system, the combination of a force pump adapted to supply a distributing system under pressure, branched distributing conduits with flow retarding and pressure absorbing outlets, a volume metering device for supplying lubricant to the force pump, means inter-related with the lubricant mechanism for metering lubricant at a slow rate to said volume meter and means automatically discharging the accumulated contents of the volume meter to the pump.

2. A lubricant supply installation including a source of lubricant and a lubricant segregating chamber, means to cause said chamber to become charged at intervals, means to withdraw a volume from said chamber, means to apply pressure to the withdrawn lubricant to force it to the parts to be lubricated and branched distributing conduits with flow retarding and pressure absorbing outlets.

3. An automatic lubricant supply installation for an operating mechanism, said installation comprising a pump inter-related with the mechanism, to be continuously operated thereby, a lubricant reservoir, means inter-related with the mechanism to cause slow feed from said reservoir, means to intercept the feed of lubricant from the reservoir and means periodically to release to the pump, predetermined volumes of the intercepted lubricant.

4. In an operating mechanism having a central lubricating system, an automatic lubricant supply installation for the latter, comprising a reservoir, an operating pump inter-related with the running mechanism, means inter-related with said mechanism for feeding lubricant from the reservoir and means interposed between the reservoir and the pump to collect and then to supply volumes of the lubricant intermittently to the pump.

5. A supply installation for an automatic lubricating system comprising the combination of a force pump, branched distributing conduits with flow retarding and pressure absorbing outlets, a lubricant reservoir, a collecting vessel, means for slowly delivering lubricant from the reservoir to the collecting vessel and means operative after the collecting vessel has filled to a predetermined level to deliver the contents thereof to the pump at more rapid rate.

6. A supply installation for an automatic lubricating system comprising the combination of a force pump, branched distributing conduits with flow retarding and pressure absorbing outlets, a lubricant reservoir, a collecting vessel, means to effect slow delivery of lubricant from the reservoir to the collecting vessel, means to establish an operative connection between the collecting vessel and the pump, after the former has been filled to a predetermined extent for withdrawal of the contents thereof to the pump and propulsion by the pump to the parts to be lubricated.

7. A central automatic supply installation for a distributing system comprising a reservoir, means controlling slow discharge therefrom, a collector intercepting the reservoir discharge, means to empty said collector after it has been filled to a predetermined extent, means to apply pressure to the discharge of the collector for propulsion thereof into the distributing system, branched distributing conduits with flow retarding and pressure absorbing outlets, and means to prevent further discharge from the reservoir when the system is to cease delivery.

8. A central lubricating system comprising a lubricant reservoir, a collecting chamber, means for slowly delivering lubricant from said reservoir to said chamber, a siphon for draining the contents of the collecting chamber after it has been filled to a predetermined level and means for dividing the siphoned lubricant among a plurality of bearings.

9. A supply installation for a central lubricating system comprising a reservoir, means inter-locked with the lubricated mechanism for initiating and sustaining slow segregation of lubricant throughout operation, a collector intercepting the segregated lubricant, a force pump continuously operated during functioning of the mechanism, branched distributing conduits with flow retarding and pressure absorbing outlets, and a siphon intermittently draining the accumulated contents of said collector and in communication with said force pump, for propulsion by the latter into a distributing system.

10. An automatic lubricant supply installation for a mechanism, comprising a lubricant reservoir, an outlet valve therefor, inter-related with the mechanism, to be maintained open while the mechanism is operating, said reservoir having a restricted outlet for slow drip therefrom while the valve is open, a pressure pump operated from the mechanism, means to prevent the delivery of said drip to the pump until a predetermined quantity thereof has accumulated and means for then releasing said accumulated charge to the pump.

11. An automatic supply installation for a central distributing system comprising a reservoir having a restricted outlet, a collector intercepting drip from the reservoir, a source of operating pressure, branched distributing conduits with flow retarding and pressure absorbing outlets, and means to empty said collector after it has been filled to a predetermined extent and to apply pressure from said source to the discharge from the collector for propulsion thereof into the distributing system.

12. A supply installation for a central lubricating system comprising a reservoir, a drip outlet therefrom, a pressure pump for feeding lubricant from said outlet to the distributing system, means for accumulating the drip from the reservoir, means for releasing the accumulated drip as a volume to the pump, and means for automatically minimizing the effect of changes in temperature on the rate of drip from the reservoir.

13. A central supply installation for a distributing system comprising a reservoir, a restricted drip outlet therefrom, a pressure pump for feeding lubricant from said outlet to the distributing system, means for accumulating the drip from the reservoir, means for releasing the accumulated drip as a volume to the pump, and means responsive to temperature changes to automatically vary the obstructing effect of the restriction, for more nearly uniform rate of drip under varying temperatures.

14. A mechanism having a central supply installation for a lubricating system comprising a reservoir having a restricted outlet, a pressure pump for feeding lubricant to the distributing system, means for accumulating the drip from the reservoir, means for releasing the accumulated drip to the pump, and means responsive to temperature changes to automatically vary the obstructing effect of the restriction, for nearly uniform rate of drip regardless of temperature changes, and a valve interlocked with the mechanism to automatically shut off drip from the reservoir when the mechanism is out of operation.

15. An automatic supply installation for a central lubricating system comprising a lubricant reservoir, a force pump, branched distributing conduits with flow retarding and pressure absorbing outlets, means for slowly delivering lubricant from said reservoir, a collector for intercepting the lubricant from the reservoir and a siphon for delivering to the pump, the contents of the collector after it has been filled to a predetermined level.

16. In a lubricating system for a mechanism, the combination of a reservoir, a pressure pump operatively connected to be driven by the operaing mechanism, branched distributing conduits with flow retarding and pressure adsorbing outlets, damming means interposed in the path of flow from the reservoir outlet to the pump, and means to periodically release dammed volumes to the pump.

17. In a liquid feed system, branched distributing conduits with flow retarding and pressure absorbing outlets, means for automatically supplying liquid in volume discharges at intervals, said means comprising a reservoir, a collector therebelow, and a siphon within said collector constituting the outlet therefrom, said collector being vented to permit the siphon to deliver after a substantial volume of liquid from the reservoir has accumulated in the collector.

18. In a liquid distributing system, the combination of a reservoir, a force pump, branched distributing conduits with flow retarding and pressure absorbing outlets, a collector interposed between said reservoir and said force pump intercepting the drip from the former and restraining flow therefrom to the latter, a siphon within said collector in communication with said pump, the parts being vented to prevent effective suction by said pump and to cause the siphon to deliver the accumulated charge to the pump from the reservoir after a predetermined level has been reached in the collector.

19. In a chassis lubricating installation, the combination of a lubricant reservoir mounted at relatively elevated position on the dash, a lubricant collector below said reservoir, a force pump communicating with said collector, means correlated with the vehicle to maintain open the outlet of said reservoir during locomotion, means restricting the flow from said reservoir to said collector, said collector restraining emission to said pump, and releasing its contents after a substantial charge has accumulated, for propulsion by the pump into the distributing system.

20. In a mechanical installation, the combination of a lubricant distributing system, a pump continuously connected with the operating mechanism for delivery into the system, and means for feeding said pump with charges of lubricant at substantial intervals, said means comprising a supply reservoir at higher level, a lubricant collector interposed between said reservoir and said pump, normally restraining delivery to the pump and releasing its charge after a substantial volume has collected therein, and means correlated with the mechanism during the operation thereof, to open the outlet of said reservoir for slow restricted emission therefrom to the collector.

21. In a motor vehicle, having a dashboard, the combination of an electric generator having a shaft, a gear pump connected in driving relation to the end of said shaft, a distributing system supplied from said pump, and means to feed substantial charges at substantial intervals to said pump, said means comprising a reservoir at relatively high level on the dashboard, a collector unit below said reservoir communicating therewith and delivering to said pump, said collector unit normally restraining the flow of lubricant to said pump and delivering its charge after the latter has accumulated by flow from the reservoir, and means for automatically shutting off communication from the reservoir to the collector during the intervals between vehicle operations.

22. In a motor vehicle having a dashboard, the combination of an electric generator having a shaft, a gear pump connected in driving relation to the end of said shaft, a distributing system supplied from said pump, and means to feed substantial charges at substantial intervals to said pump, said means comprising a reservoir at relatively high level on the dashboard, a collector unit below said reservoir communicating therewith and delivering to said pump, said collector unit normally restraining the flow of lubricant to said pump and delivering its charge after the latter has accumulated by flow from the reservoir, means for automatically shutting off communication from the reservoir, to the collector during the intervals between vehicle operations, said means comprising a normally seated outlet valve and means for maintaining the valve open during vehicle operation, said latter means comprising a solenoid lifter interconnected with an electric circuit of the vehicle.

23. In a central lubricating system, the combination of a reservoir, a force pump, an outlet pipe from the reservoir, and a drip collecting arrangement therebelow comprising a thermostatically controlled drip rate control element, and a drip collector receptacle, and a siphon within said receptacle communicating to drain the contents of the latter to said force pump, and venting means to prevent the application of suction from said pump to said siphon.

24. In a central lubricating system, the combination of a reservoir, a force pump below said reservoir, means delivering substantial volumes of lubricant at substantial intervals to the pump, said means including a drip outlet from the reservoir, a drip collector therefor, a siphon within said drip collector delivering the contents of the latter to the pump, and means for maintaining substantial constancy of lubricant delivery under varying temperatures, said means comprising a thermostatic drip control automatically increasing the size of the drip outlet with drop of temperature.

25. In a central lubricating system, the combination of a lubricant reservoir, a drip collector therebelow, a force pump, a siphon within said drip collector communicating with the inlet of said force pump, means to prevent the application of suction from said force pump to said siphon to cause the latter to deliver an accumulated volume to the pump for propulsion by the latter into the distributing system, means correlated with the operating mechanism to permit continuous gravity flow from the reservoir during operation of the mechanism, and a thermostatically adjusted flow restriction element maintaining the rate of drip to said collector nearly constant, regardless of varying temperatures and varying viscosities of the lubricant.

26. In a lubricant distributing system, the combination of a reservoir, having an outlet valve inter-related with the lubricated mechanism, to open during operation thereof, an outlet pipe extending therebelow, a drip outlet near one end of said pipe controlling the rate of drip under the gravity head, a drip collector below said drip outlet, a force pump and means for delivering the contents of said drip collector in substantially a single volume after a period of accumulation.

27. In a lubricant distributing system, the combination of a reservoir, having an outlet valve inter-related with the lubricated mechanism, to open during operation thereof, an outlet pipe extending therebelow, a drip outlet near one end of said pipe controlling the rate of drip under the gravity head, a drip collector below said drip outlet, a force pump and means for delivering the contents of said drip collector in substantially a single volume after a period of accumulation, the drip outlet being thermostatically controlled to compensate for changes of viscosities under changing temperatures of the lubricant, in order to insure substantial constancy of drip rate.

28. In a central lubricating system, a source of lubricant, a distributing system supplied therefrom under pressure and having highly restricted flow controlling outlets, metering means for governing the volume fed to the distributing system, said metering means including a controlling inlet and a thermostatic element regulating the size of said inlet in approximate proportion to the viscosity of the lubricant.

29. In a central lubricating system, the combination of a pressure pump, a distributing system supplied therefrom, means to feed a succession of predetermined volumes at predetermined intervals to said pump, means to pre-collect said volumes by drip from a source of lubricant, and means to compensate for the change in rate of drip due to increase of viscosity with lowering temperatures, said means comprising a thermostatic regulator of the drip opening.

30. A temperature compensated flow regulator for a central distributing system, said regulator comprising a casing, a bellows diaphragm having an expansible fluid therein, a taper pin protruding from the free end of said diaphragm, an enclosing casing for said diaphragm, having an inlet at its upper end, a restriction outlet head into which said pin extends, whereby the pin is partially withdrawn from the outlet head by lowering of temperatures for increase of the effective drip opening, a spring positioned between said head and said diaphragm resisting expansion of said diaphragm and a stop limiting expansive movement of said element.

31. In a lubricating system, the combination of a lubricant reservoir, a valve controlling the exit therefrom, a solenoid inter-related with the mechanism, to be energized during operation of the latter for opening the valve, means intercepting the outflow from the reservoir and means intermittently releasing substantial volumes of the collected lubricant.

32. In a chassis lubricating system, the combination of a lubricant reservoir, a valve controlling the drain therefrom, a solenoid connected with the electric system of the vehicle for maintaining the valve open during vehicle operation, a pressure pump, and means interposed between the reservoir and the pump for collecting the drain and intermittently delivering substantial volumes of the collected lubricant to the pump.

33. In a chassis lubricating system; the combination of a pressure pump embodied in a unit with one of the mechanical accessories of the vehicle and driven in unison therewith during operation thereof, a source of lubricant, means to limit the supply of lubricant from said source to said pump in accordance with the requirement of the system and a pressure relief valve associated with said pump to prevent excess pressure on a distributing system supplied therefrom.

34. In a central lubricating system, the combination of a reservoir having an outlet valve, a centrifugal control element adapted to be driven from the lubricated mechanism and a transmission between said control element and said valve to maintain the latter open throughout operation of the mechanism, for continuous feed therefrom.

35. In a lubricating installation, the combination of a reservoir, a force pump adapted to deliver its charge under pressure into a distributing system, a lubricant collector interposed between said reservoir and said pump, and fed from the former and delivering to the latter, said reservoir having an outlet valve interconnected with the control that governs the operative connection of the mechanism, thereby to maintain the valve open throughout operation of the mechanism, means retarding the flow from the reservoir to the collector, said collector restraining emission to the pump until a definite volume has collected therein and then delivering said volume to the pump.

36. A central liquid distributing system comprising a liquid reservoir, a force pump, branched distributing conduits with flow retarding and pressure absorbing outlets, a collector below said reservoir intervening between the former and the latter, a valve controlling the drip from the reservoir to the collector, a siphon within said collector communicating with said pump, and means venting both ends of the siphon to prevent effective suction thereon by the pump, thereby to cause the siphon to drain the contents of said collector when a predetermined level has been reached therein.

37. A central liquid distributing system comprising a liquid reservoir, a force pump, branched distributing conduits with flow retarding and pressure absorbing outlets, a collector below said reservoir intervening between the former and the latter, a valve controlling the drip from the reservoir to the collector, a siphon within said collector communicating with said pump, and means venting the inlet of said pump to prevent the application of suction therefrom to the siphon, whereby the latter will drain the contents of the collector when the lubricant in the latter has reached a sufficient level 38. The combination of a lubricating system including a reservoir having a restricted outlet for gravity drip therefrom, a drip collector below said reservoir, a rotary pump below said drip collector, said collector communicating with the inlet of said pump, said pump adapted to be connected to a distributing system, said pump having an inlet vent pipe extending upward therefrom to a level above that of the lubricant in the reservoir.

39. In a chassis lubricating system, the combination of a reservoir at an elevated level on the vehicle, said reservoir having a gravity drip outlet, means automatically closing said outlet when the vehicle is out of operation, a drip collector below said reservoir, a gear pump at a level below that of said collector, a siphon within said drip collector communicating at its outer end with the inlet of said gear pump, said pump having an upstanding vent pipe communicating with the inlet thereof and extending upward therefrom in front of the dash to a level above that of the lubricant in said reservoir, the upper end thereof being constructed and arranged to prevent the entry of dirt.

40. A central liquid feed system including a source of liquid, a distributing system having an inlet and a plurality of restricted outlets, a force pump for propelling liquid from said reservoir through said inlet, a liquid collector interposed between said reservoir and said pump, vented transfer means for subjecting predetermined collected volumes of liquid from said collector to the action of said pump, means for shutting off flow from the reservoir to the collector, and a valve adapted to be opened by said pump during liquid propulsion thereby and serving normally to close the head of said distributing system from the vented transfer means.

41. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collection apparatus to the pump periodically when a desired amount of lubricant has collected therein, and means for actuating said pump from the machine being lubricated.

42. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, and means for actuating said pump from the machine being lubricated, said emptying means including a siphon.

43. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, and means for actuating said pump from the machine being lubricated, said system including flow controlling drip plug outlets governing the division of each of the successive charges delivered from the pump.

44. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, and means for actuating said pump from the machine being lubricated, said pump being provided with an inlet compartment and said compartment being provided with a vent extending to above the highest level of lubricant in the collecting apparatus.

45. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, and means for actuating said pump from the machine being lubricated, said lubricant feeding means including temperature controlled means for maintaining a constancy of feed at varying temperatures.

46. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, and means for actuating said pump from the machine being lubricated, said lubricant feeding means including a restricted outlet and being provided with a thermostatic control to increase the area of the outlet automatically with fall in temperature.

47. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, and means for actuating said pump from the machine being lubricated, the supply chamber, the collecting apparatus and the pump being combined in a unitary construction.

48. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, means for actuating said pump from the machine being lubricated, and a helical lifting device for raising the lubricant from the supply chamber to feed the collecting apparatus.

49. A central lubricating installation for a mechanism with a series of bearings comprising a central lubricant reservoir, a lubricant receiver supplied from said reservoir, a pressure source receiving lubricant from said receiver, a distributing branched conduit system leading from said source to the bearings, flow metering outlets associated with said system adjacent the bearings, means for feeding said receiver from said reservoir, and valves associated with said receiver, one of which cuts off the feed when the mechanism is idle and other of which regulates the feed when the mechanism is running.

50. A central lubricating installation for a mechanism with a series of bearings comprising a central lubricant reservoir, a lubricant receiver supplied from said reservoir, a pressure source receiving lubricant from said receiver, a distributing branched conduit system leading from said source to the bearings, flow metering outlets associated with said system adjacent the bearings, means for feeding said receiver from said reservoir provided with an orifical flow metering device, and means to maintain a constant lubricant head upon said device.

51. A central lubricating installation for a mechanism with a series of bearings comprising a central lubricant reservoir, a substantially continuously operating lubricant pressure source intermittently receiving its supply from said reservoir, means to supply lubricant intermittently from said reservoir to said source, a distributing conduit system leading to said bearings with restricted flow metering outlets and a master restriction ahead of the inlet of said system and controlling the flow thereinto, said pressure source being positioned between said master restriction and the inlet of said system.

52. A central lubricating installation for a mechanism with a series of bearings comprising a central lubricant reservoir, a substantially continuously operating lubricant pressure source intermittently receiving its supply from said reservoir, means to supply lubricant intermittently from said reservoir to said source, a distributing conduit system leading to said bearings with restricted flow metering outlets and a master restriction ahead of the inlet of said system and controlling the flow thereinto, said master restriction and said outlet restrictions being so constructed and arranged as to offer a substantially constant flow retarding effect.

53. A central lubricating installation for a mechanism with a series of bearings comprising a central lubricant reservoir, a substantially continuously operating lubricant pressure source intermittently receiving its supply from said reservoir, means to supply lubricant intermittently from said reservoir to said source, a distributing conduit system leading to said bearings with restricted flow metering outlets and a master restriction ahead of the inlet of said system and controlling the flow thereinto, said master restriction being provided with a thermostatic control to decrease its restrictive effect with lowered temperatures.

54. A central lubricating installation for a mechanism provided with a series of bearings comprising a central lubricant reservoir, a substantially continuously discharging lubricant source supplied from said reservoir operative during operation of said mechanism, an intermittently discharging accumulating lubricant source supplied from said continuous source and a distributing conduit system to said bearings with flow metering outlets supplied from said intermittent source, said intermittent source being associated with means to create lubricant pressure in said system and both of said sources being automatically actuated upon supply from said reservoir.

55. A central lubricating installation for a mechanism provided wtih a series of bearings comprising a central lubricant reservoir, a substantially continuously discharging lubricant source supplied from said reservoir operative during operation of said mechanism, an intermittently discharging accumulating lubricant source supplied from said continuous source and a distributing conduit system to said bearings with flow metering outlets supplied from said intermittent source, said continuous source being positioned above said intermittent source and discharging thereto by gravity and both of said sources being automatically actuated upon supply from said reservoir.

56. In a central lubricating distributing system, the combination of a source of lubricant supply, a pressure pump, a distributing system with outlets to bearings to receive lubricant, means metering the volume to said pump by drip from a source of supply, and thermostatic means so positioned as to be exposed to and regulated by atmospheric temperature and so constructed and arranged as to automatically increase the size of the drip outlet as the temperature drops, located adjacent the inlet of the system substantially away from the outlets thereof.

57. In combination with an automobile vehicle provided with an engine, a chassis lubricating installation comprising a lubricant reservoir, a gear pump driven from the engine, a gravity supply from said reservoir to said gear pump, a distributing conduit system to receive the gear pump discharge and provided with highly restricted drip plug outlets to retard the rate of said discharge and means to alternately actuate and interrupt said gravity supply.

58. A unitary feed installation including a reservoir, a discharge pump associated therewith, a lubricant collector above said pump, means for feeding liquid from the reservoir to the collector, and means for intermittently transferring the accumulated contents of said collector to said pump.

59. A unitary feed installation including a reservoir, a pump associated therewith, a lubricant collector at level above that of said pump, means for lifting liquid in said reservoir to the collector and means for intermittently siphoning the accumulated contents of said collector to said pump for propulsion thereby.

60. In apparatus of the character described, a reservoir, continuously operated lifting means for raising liquid in said reservoir to a higher level, a lubricant collector, a drip outlet in the top thereof for slow drain of lifted lubricant to said collector, a force pump below said collector, and means for intermittently transferring the accumulated contents of said collector to said force pump.

61. In combination with an automotive vehicle of the type including a chassis provided with distributed bearings and an engine supported upon said chassis and provided with an enclosure, with a circulating pump and with a main crank shaft and auxiliary shafts driven therefrom and having substantially the same order of speed as said crank shaft; a central chassis lubricating installation comprising a central lubricant reservoir, a lubricant pump actuated directly from one of said auxiliary shafts and a branched distributing system with a flow metering inlet adjacent said pump and flow metering outlets adjacent said bearings.

62. In combination with an automotive vehicle of the type including a chassis provided with distributed bearings and an engine supported upon said chassis and provided with a main crank shaft and auxiliary shafts driven therefrom; a central chassis lubricating installation comprising a central lubricant reservoir, a lubricant pump actuated directly from one of said auxiliary shafts, a branched distributing system with flow metering outlets adjacent said bearings and a supply line from said reservoir to said pump provided with automatically actuated flow control means.

63. In combination with an automotive vehicle of the type including a chassis provided with distributed bearings and an engine supported upon said chassis and provided with a main crank shaft and auxiliary shafts driven therefrom; a central chassis lubricating installation comprising a central lubricant reservoir, a lubricant pump actuated directly from one of said auxiliary shafts, a branched distributing system with flow metering outlets adjacent said bearings and a supply line from said reservoir to said pump provided with thermostatically actuated flow control means.

64. In combination with an automotive vehicle of the type including a chassis provided with distributed bearings and an engine supported upon said chassis and provided with a main crank shaft and auxiliary shafts driven therefrom; a central chassis lubricating installation comprising a central lubricant reservoir, a lubricant pump actuated directly from one of said auxiliary shafts, a branched distributing system with flow metering outlets adjacent said bearings and means to control the amount of discharge of said pump actuated in accordance with the time of operation of the vehicle and independent of engine speed, the rate of discharge of said pump being dependent on engine speed.

65. A central lubricating installation for a mechanism provided with an auxiliary electrical generator driven therefrom comprising a lubricant feed, a lubricant pressure source and a branched distribution system, said feed and said source supplied by said feed, being actuated simultaneously with said generator, the feed from the electrical energy created by said generator, and the source, from the shaft of said generator.

66. A central lubricating installation for a mechanism provided with a series of bearings comprising a reservoir, a branched distribution system leading to said bearings supplied from said reservoir and a plurality of reciprocating flow control devices between said reservoir and said system, one of which is actuated upon engine operation and interrupted upon stoppage of the mechanism and the other of which is actuated by a thermostatic control.

67. A central lubricating installation for a mechanism provided with a series of bearings comprising a reservoir, a branched distribution system leading to said bearings supplied from said reservoir, and a plurality of rotary lubricant moving devices between said reservoir and said system, one of which applies pressure to said system and the other of which supplies lubricant to said pressure supplying device.

68. A central lubricating installation for a mechanism with a series of bearings comprising a branched distribution system leading to said bearings, a high capacity pump supplying said system, a low capacity reservoir supplying said pump and a high capacity reservoir supplying said low capacity reservoir, the reservoirs and the pump being so constructed and arranged that the high capacity reservoir supplies said low capacity reservoir at a slower rate than said pump draws lubricant from said low capacity reservoir and forces it into said distribution system.

69. A lubricant distribution installation for a plurality of distributed bearings comprising a central reservoir, a central pressure source supplied therefrom, a branched distributing conduit, the inlet of which is supplied from said source and the outlets of which are provided with flow proportioning restriction devices, and a temperature-responsive device for controlling the lubricant flow from said reservoir and through said source and said inlet, permitting increased lubricant flow with lower temperatures and causing decreased lubricant flow with higher temperatures, said temperature-responsive device including a variable lubricant flow restriction and means to vary the flow restricting effect, of said lubricant flow restriction with varying temperature.

70. In a chassis lubricating system, an electric generator, a gear pump unit provided with an outlet mounted on the end of said generator and having a driving shaft protruding therefrom in alignment with the generator shaft and releasably coupled thereto, means holding said pump to said generator, a cover for said pump at the exterior face of the unit, having an inlet and an outlet nipple, a by-pass connecting said inlet and said outlet, and a pressure relief valve normally closing said by-pass, said outlet of the gear pump unit being provided with a restriction to limit the output thereof to the system.

71. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, means for actuating said pump from the machine being lubricated and a device for lifting the lubricant from the supply chamber, and a gravity flow passage which feeds the elevated lubricant into the collecting apparatus.

72. In combination with a machine, a central lubricant distributing installation including a lubricant supply chamber, a collecting apparatus, a pump, a branched distributing system supplied by said pump, means for feeding lubricant into the collecting apparatus throughout the operation of the machine, means for actuating said feeding means when the machine is started and for causing discontinuation of the feed when the machine is stopped, means for emptying the collecting apparatus to the pump periodically when a desired amount of lubricant has collected therein, means for actuating said pump from the machine being lubricated and a filter in the course of flow of the lubricant from the supply chamber to the collecting apparatus.

73. A central lubricating installation for a mechanism with a series of bearings comprising a central lubricant reservoir, a lubricant receiver supplied from said reservoir, a pressure pump receiving lubricant from said receiver, a distributing branched conduit system leading from said pump to the bearings, flow metering outlets associated with said system adjacent the bearings, the volumetric delivery of said pump for relatively short periods being substantially greater than the volumetric capacity of said receiver and means in the course of flow between the receiver and the pump to cause collection of a desired volume of lubricant in said receiver from said reservoir and at intervals to dispense said volume to said pump.

74. A central lubricating installation for a mechanism with a series of bearings comprising a central lubricant reservoir, a lubricant receiver supplied from said reservoir, a pressure source receiving lubricant from said receiver, a distributing branched conduit system leading from said source to the bearings, flow metering outlets associated with said system adjacent the bearings, the normal rate of lubricant discharge of said source being substantially greater than the requirements of said bearings and means to decrease the lubricant flow from said receiver to said source of the bearing requirements.

75. A central lubricating installation for a mechanism with a series of bearings comprising a central lubricant reservoir, a lubricant receiver supplied from said reservoir, a connection between said reservoir and receiver provided with a valve, a pressure source receiving lubricant from said receiver, a distributing branched conduit system leading from said source to the bearings, flow metering outlets associated with said system adjacent the bearings, automatic means to operate said valve upon operation of said mechanism to feed said receiver continuously from said reservoir during operation of the mechanism, and means to feed said source intermittently from said receiver.

76. A central lubricating installation for a mechanism with a series of bearings comprising a central lubricant reservoir, a lubricant receiver supplied from said reservoir, a pressure source receiving lubricant from said receiver, a distributing branched conduit system leading from said source to the bearings, flow metering outlets associated with said system adjacent the bearings, means for feeding said receiver from said reservoir and actuating means for said feeding means and said source motivated by said mechanism, the means for the former being arranged for automatic energization directly from a non-rotary part of said mechanism and the means for the latter being directly driven automatically by a rotary connection from said mechanism.

77. A central lubricating installation for a mechanism with a series of bearings comprising a central lubricant reservoir, a substantially continuously operating lubricant pressure source intermittently receiving its supply from said reservoir, means to supply lubricant intermittently from said reservoir to said source, a distributing conduit system leading to said bearings with restricted flow metering outlets and a master flow restriction ahead of the inlet of said system in the course of flow thereinto and controlling the flow thereinto, said master restriction and said outlet restrictions being positioned as to be affected by and maintained at atmospheric temperature.

78. A supply installation for a liquid distributing system comprising a reservoir, an upwardly extending cylindrical vessel secured to the bottom of said reservoir and having a transverse partition and a siphon tube having its shorter leg above said partition, its longer leg extending through said partition to near the bottom of said vessel, means venting both ends of said siphon and a force pump connected to feed from the reservoir to the vessel above said partition, the vessel below said partition being connected to feed said system.

JOSEPH BIJUR.